United States Patent
Kyono et al.

(10) Patent No.: US 10,913,000 B2
(45) Date of Patent: Feb. 9, 2021

(54) INFORMATION STORAGE MEDIUM AND SERVER DEVICE

(71) Applicant: BANDAI NAMCO Entertainment Inc., Tokyo (JP)

(72) Inventors: Akihiro Kyono, Niiza (JP); Ken Masumori, Tokyo (JP)

(73) Assignee: BANDAI NAMCO ENTERTAINMENT INC., Tokyo (JP)

( * ) Notice: Subject to any disclaimer, the term of this patent is extended or adjusted under 35 U.S.C. 154(b) by 158 days.

(21) Appl. No.: 16/119,101

(22) Filed: Aug. 31, 2018

(65) Prior Publication Data

US 2019/0070510 A1    Mar. 7, 2019

(30) Foreign Application Priority Data

Sep. 6, 2017  (JP) .................. 2017-170917

(51) Int. Cl.
  *A63F 13/67*  (2014.01)
  *A63F 13/5372*  (2014.01)
  *G06Q 20/08*  (2012.01)
  *A63F 13/5375*  (2014.01)
  (Continued)

(52) U.S. Cl.
  CPC .......... *A63F 13/67* (2014.09); *A63F 13/5372* (2014.09); *A63F 13/5375* (2014.09); *G06F 16/951* (2019.01); *G06Q 20/085* (2013.01); *G07F 17/3295* (2013.01)

(58) Field of Classification Search
  CPC .. A63F 13/67; A63F 13/5372; A63F 13/5375; A63F 13/847; A63F 13/5378; A63F 13/216; A63F 13/69; A63F 13/335; A63F 13/533; A63F 13/55; A63F 13/792;
  (Continued)

(56) References Cited

U.S. PATENT DOCUMENTS

2005/0119053 A1* 6/2005 Suzuki ............... A63F 13/12
                                                 463/42
2012/0202600 A1* 8/2012 Jalili ................. A63F 13/80
                                                 463/42

(Continued)

FOREIGN PATENT DOCUMENTS

JP            5989621 B2     9/2016

*Primary Examiner* — Kang Hu
*Assistant Examiner* — Thomas H Henry
(74) *Attorney, Agent, or Firm* — Oliff PLC

(57) ABSTRACT

Provided is a server device including: target control means for controlling movement of an operation target in a game space in accordance with operation input of a player; object giving means for giving, when the player has established a given positional condition, the player a collection item or a chance to acquire the collection item; search information generation means for generating, as search information supplied to the player, information on the presence/absence or a position of the collection item in a search area that moves in the game space in accordance with the movement of the operation target; search information control means for controlling accuracy of the search information in accordance with a collection result of the collection item by the player; and provision control means for controlling the provision of an event in accordance with the collection result of the collection item by the player.

20 Claims, 13 Drawing Sheets

(51) Int. Cl.
*G06F 16/951* (2019.01)
*G07F 17/32* (2006.01)
(58) Field of Classification Search
CPC . G06F 17/3295; G06F 16/951; G06Q 20/085; G06Q 20/3224
See application file for complete search history.

(56) References Cited

U.S. PATENT DOCUMENTS

2015/0080127 A1* 3/2015 Tamaoki ............... A63F 13/803
 463/31
2018/0256977 A1* 9/2018 Wakasono .......... A63F 13/5378

* cited by examiner

| PLAYER ID | OWNED ITEM | | | | TEAM TO WHICH PLAYER BELONGS | | PLAYER LEVEL | NUMBER OF COLLEC-TIONS | ACCU-RACY |
|---|---|---|---|---|---|---|---|---|---|
| | ITEM ID | TYPE | ATTRIBUTE | LEVEL | TEAM ID | TEAM ATTRI-BUTE | | | |
| 001 | 001 | COLLECTION ITEM | A | LV1 | 01 | TURTLE | LV2 | 4 | HIGH |
| | 002 | COLLECTION ITEM | B | LV1 | | | | | |
| | ... | ... | ... | ... | | | | | |
| | 010 | SEARCH ITEM | A | LV1 | | | | | |
| ... | ... | ... | ... | ... | ... | ... | ... | ... | ... |

INFORMATION STORAGE MEDIUM AND SERVER DEVICE

The present application contains the contents of Japanese Patent Application No. 2017-170917 filed in Sep. 6, 2017.

BACKGROUND OF THE INVENTION

The present invention relates to an information storage medium and a server device.

Some action adventure games, action roll playing games (RPGs), problem-solving games, and dungeon games are based on games in which players collect items scattered in a game space. Such collection games are called item collection games, item search games, and treasure hunt games (hereinafter referred to as "item collection games"). Players in an item collection game can feel a sense of achievement by events, such as movement in the game space, finding of items, increase in number and type of items owned by themselves, and winning of a game to bet an item.

In recent years, games using a network have become widespread. Such games include the ones where a plurality of players make up a team and collaboratively attack an enemy to complete missions. For example, Japanese Patent No. 5989621 discloses an example in which a tactical system for fighters called "data link" is applied to a game. In this system, information is transmitted and shared among fighters on the same side to enhance radar performance in order to gain advantage in operation.

However, appropriate measures for increasing the attractiveness of item search have not been taken for many item collection games, and the measures are insufficient.

SUMMARY

The present invention can provide an information storage medium and a server device capable of appropriately controlling the difficulty level of item search in an item collection game and providing a game having effectively improved attractiveness of the item search itself.

A non-transitory computer-readable information storage medium according to a first aspect of the present invention has stored thereon a program of a game in which a player searches for two or more collection items arranged at different positions in a game space and a given event is provided to the player in accordance with a collection result of the collection items, the program causing a computer to function as:

object arrangement means for arranging a plurality of the collection items and an operation target of the player in the game space;

target control means for controlling movement of the operation target in the game space in accordance with operation input of the player;

object giving means for giving, when the player has established a given positional condition between each of the collection items and the operation target in the game space, the player the collection item or a chance to acquire the collection item;

result management means for managing a collection result of the collection items by the player in association with the operation target of the player;

search information generation means for setting a search area that moves in the game space in accordance with the movement of the operation target, and generating information on presence/absence or a position of each of the collection items in the search area, as search information supplied to the player;

search information control means for controlling the search information supplied to the player in accordance with the collection result of the collection items by the player; and provision control means for controlling the provision of the given event to the player in accordance with the collection result of the collection items by the player.

A server device according to a second aspect of the present invention is configured to execute a game in which a player searches for two or more collection items arranged at different positions in a game space and a given event is provided to the player in accordance with a collection result of the collection items, the server device including:

object arrangement means for arranging a plurality of the collection items and an operation target of the player in the game space;

target control means for controlling movement of the operation target in the game space in accordance with operation input of the player;

object giving means for giving, when the player has established a given positional condition between each of the collection items and the operation target in the game space, the player the collection item or a chance to acquire the collection item;

result management means for managing a collection result of the collection items by the player in association with the operation target of the player;

search information generation means for setting a search area that moves in the game space in accordance with the movement of the operation target, and generating information on presence/absence or a position of each of the collection items in the search area, as search information supplied to the player;

search information control means for controlling the search information supplied to the player in accordance with the collection result of the collection items by the player; and provision control means for controlling the provision of the given event to the player in accordance with the collection result of the collection items by the player.

BRIEF DESCRIPTION OF THE SEVERAL VIEWS OF THE DRAWING

FIG. 4 is a diagram illustrating an example of an owned item list according to one embodiment of the present invention;

Figure 1:
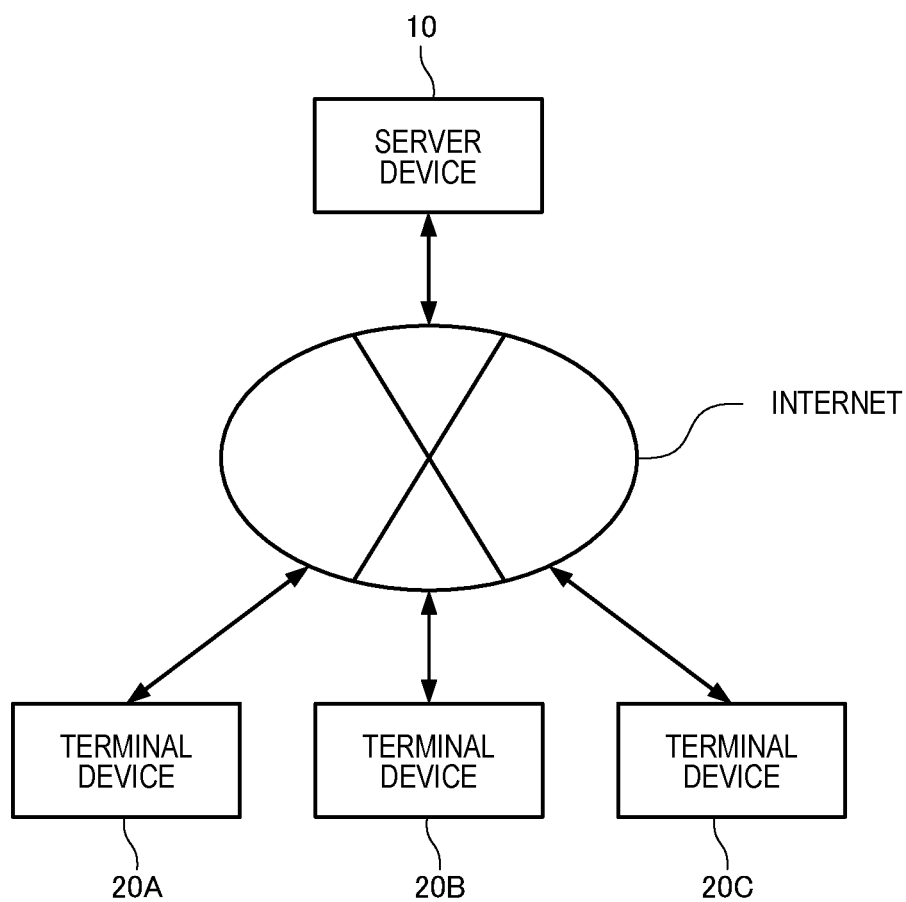
FIG. 1 is a diagram illustrating an example of a configuration of a game system according to one embodiment of the present invention.

DETAILED DESCRIPTION OF THE EMBODIMENT (1) A non-transitory computer-readable information storage medium according to one embodiment of the present invention has stored thereon a program of a game in which a player searches for two or more collection items arranged at different positions in a game space and a given event is provided to the player in accordance with a collection result of the collection items, the program causing a computer to function as:

object arrangement means for arranging a plurality of the collection items and an operation target of the player in the game space;

target control means for controlling movement of the operation target in the game space in accordance with operation input of the player;

object giving means for giving, when the player has established a given positional condition between each of the collection items and the operation target in the game space, the player the collection item or a chance to acquire the collection item;

result management means for managing a collection result of the collection items by the player in association with the operation target of the player;

search information generation means for setting a search area that moves in the game space in accordance with the movement of the operation target, and generating information on presence/absence or a position of each of the collection items in the search area, as search information supplied to the player;

search information control means for controlling the search information supplied to the player in accordance with the collection result of the collection items by the player; and provision control means for controlling the provision of the given event to the player in accordance with the collection result of the collection items by the player.

The "game space" includes an object space in which an operation target of a player is arranged.

Examples of the "collection items" include an item such as a treasure object.

The "collection result" includes a combination of the number of collected collection items, collection speed, and attributes of collected collection items.

The "operation target" includes a mobile object that moves in a game space, a player character (including avatar of player) that moves in a game space, and a pointer or a cursor that moves in a game space. A possible case is that when a player carrying a terminal device moves in a real space, an operation target (such as avatar) moves in a game space while following the player. In this case, the player can feel as if the real space was the game space. In the terminal device, a device (such as GPS receiver) for detecting position coordinates of the player in the real space is mounted.

The "positional condition" includes a condition that a collection item and an operation target contact each other, a condition that an operation target is located in a predetermined area associated with a collection item, and a condition that a distance between a collection item and an operation target becomes less than a threshold.

"Giving the player the collection item or a chance to acquire the collection item" includes directly or indirectly giving a player a collection item and giving a player a chance to acquire a collection item.

The "acquisition chance" includes a lottery event in which a collection item is given to a player by lottery, a game event in which a collection item is given to a player when the player has satisfied an acquisition condition, a game event for competing against another player for betting a collection item, a game event for competing against a computer for betting a collection item, and a game event for competing for a collection item against another player owning the collection item.

The "search information" includes text information, a blinking pattern, and map information indicating the presence/absence or the position of a collection item.

The "control of search information" includes control of the presence/absence of search information, the spatial resolution, the temporal resolution, the size of the search area, and the shape of the search area.

According to the above-mentioned embodiment, when executing a game in which a player searches for two or more collection items arranged at different positions in a game space and a given event is provided to the player in accordance with a collection result of the collection items, a search area that moves in the game space in accordance with the movement of an operation target of the player in the game space is set, and information on the presence/absence or the position of the collection item in the search area is generated as search information supplied to the player. In this case, by employing the configuration in which search information that can be obtained by the player changes in accordance with a collection result of the collection items by the player, for example, the difficulty level of searching can be appropriately controlled by providing a change such as increase or suppression in difficulty level of searching as the collection of collection items progresses. Consequently, a game having effectively improved attractiveness of searching of a collection item for receiving the provision of a given event can be provided.

(2) In the information storage medium, the object arrangement means may further arrange, in the game space, a search item necessary for the player to receive the supply of the search information, the object giving means may give the player the search item or a chance to acquire the search item when the player has established a given positional condition between the search item and the operation target, the result management means may further manage a collection result of the search item by the player in association with the operation target of the player, and the search information control means may control the search information supplied to the player in accordance with the collection result of the search item by the player.

Examples of the "search item" include a radar item, a sonar item, and a sensor item.

The "positional condition" include a condition that a search item and an operation target contact each other, a condition that an operation target is located in a predetermined area associated with a search item, and a condition that a distance between a search item and an operation target becomes less than a threshold.

The "acquisition chance" includes a lottery event in which a search item is given to a player by lottery, a game event in which a search item is given to a player when the player has satisfied an acquisition condition, a game event for completing against another player for betting a search item, a game event for competing against a computer for betting a search item, and a game event for completing for a search item against another player owning the search item.

The "collection result" includes a combination of the presence/absence of acquired search items, the number of collected search items, collection speed, and attributes of collected search items.

According to the above-mentioned embodiment, by further employing the configuration in which the search information supplied to the player is controlled in accordance with the collection result of search items by the player, the search and collection of search items and the search and collection of collection items can be associated with each other to further increase the attractiveness of searching of collection items in a game.

(3) In the information storage medium, the game may be a competition game in which the player or a team thereof competes for collection results of the collection items against an opponent.

The "opponent" includes players other than the player, teams other than a team to which the player belongs, and computers.

The "competition game" includes a game in which a player competes against another player, a game in which a team to which a player belongs competes against another team, and a game in which a player or a team to which the player belongs competes against a computer.

According to the above-mentioned configuration, a game in which a player or a team to which the player belongs completes for collection results of collection items among other players or other teams can be provided.

(4) In the information storage medium, when the player or team thereof has established a given competition start condition, the object giving means may give the player or team thereof a chance to play a game for competing against the opponent for betting each of the collection items, as a chance to acquire the collection item.

The "competition start condition" includes a condition that the player or team thereof and an opponent are present in an area where a collection item is present at the same timing, a condition that both of the player or team thereof and an opponent have accepted a competition, and a condition that the player or team thereof and an opponent are "enemies". Whether a player or a team is an "enemy" can be determined, for example, on the basis of the attribute of the player or the team.

According to the above-mentioned embodiment, a chance to play a game for competing against the opponent for betting the collection item can be given to the player or team thereof as a chance to acquire the collection item, and hence a game in which a player or a team to which the player belongs competes for collection results of collection items among other players or other teams while enjoying a competition game for betting the collection item can be provided.

(5) In the information storage medium, when the player or team thereof owns the search item, the search information control means may control the search information supplied to the player or team thereof in accordance with at least one of a distance from an operation target of the player or team thereof to an operation target of another player or a team thereof owing the search item, and the number of other players or teams thereof.

According to the above-mentioned embodiment, when a player or a team owns a search item, the player can be given a feeling as if the player was interfered (obstructed) by a search item of another player or team. Thus, a player or a team thereof owning a search item can gain advantage on searching of collection items by tactically performing at least one of formation and power increase of operation targets.

(6) In the information storage medium, when the player owns the search item and the player has created a team with another player owing the search item, the search information control means may change the search information supplied to the player.

According to the above-mentioned embodiment, a player owning a search item can change his/her own search information by creating a team with another player owing a search item. Thus, a player owning a search item can gain advantage on searching of collection items by tactically organizing the team.

(7) In the information storage medium, when the player owns the search item, the search information control means may control the search information supplied to the player in accordance with the number of search items owned by an entire team to which the player belongs, a type of the search items owned by the entire team to which the player belongs, or a combination thereof.

According to the above-mentioned embodiment, a player owning a search item can change his/her own search information by getting involved in acquisition of a search item by another player belonging to the same team as the player to change the number or type of search items owned by the entire team or a combination thereof. Consequently, the player owning the search item can gain advantage on searching of collection items by tactically cooperating in the same team.

(8) In the information storage medium, when the player or team thereof owns the search item, the search information control means may control the search information supplied to the player or team thereof in accordance with an attribute of the player or team thereof, an attribute of another player or a team thereof owning the search item, and the number of other players or teams thereof.

According to the above-mentioned embodiment, when a player or a team owns a search item, the player can be given a feeling as if the player was interfered (obstructed) by a search item of another player or team. Consequently, a player or a team thereof owning a search item can gain advantage on searching of collection items, for example, by tactically increasing forces.

(9) The information storage medium may further cause the computer to function as communication management means for managing, when the player or team thereof owns the search item, communication performed between the player or team thereof and another player or a team thereof owning the search item.

According to the above-mentioned embodiment, when a plurality of players or teams thereof each own a search item, the players or the teams can communicate with each other. Thus, for example, a player or a team thereof owning a search item can exchange search information around him/her (them) with other players or teams, and hence can gain advantage on the progress of searching of collection items.

(10) In the information storage medium,
the result management means may further manage a parameter set to the player or team thereof, and
when the player or team thereof owns the search item, the search information control means may control the search information supplied to the player or team thereof in accordance with the parameter of the player or team thereof.

The "parameter" includes an attribute and a level.

According to the above-mentioned embodiment, when players or teams thereof each have a search item, search information changes depending on the parameters of the players or the teams. Thus, a player or a team thereof owning a search item can indirectly control search information by his/herself by changing the parameter of the player or team thereof.

(11) The information storage medium may further cause the computer to function as limiting means for limiting team creation or team joining by the player when the player has not established a given collection condition for the collection result of each of the collection items.

The "collection condition" includes a condition that the player owns a predetermined number or more of collection items.

According to the above-mentioned embodiment, team creation or team joining by the player is limited in accordance with the collection result of collection items by the player, and hence a gap (feeling of inequality) among players in the same team can be reduced.

(12) In the information storage medium, the search information may include at least one of information on presence/absence of each of the collection items in the search area, information on a position of the collection item in the search area, and information on suggestion of the position of the collection item in the search area.

The "presence/absence of collection item" can be presented to a player, for example, by hue, luminance, or a blinking pattern.

The "position of collection item" can be presented to a player, for example, by a two-dimensional map or a three-dimensional map.

The "suggestion of position of collection item" includes information such as a hint indicating the position of the collection item.

According to the above-mentioned embodiment, the player can use a search item as an index for searching for a collection item.

(13) In the information storage medium, the search information may be information indicating an image of the search area, and the search information control means may control at least one of spatial resolution of the image serving as the search information, temporal resolution of the image, a size of the search area, and a shape of the search area.

The "spatial resolution" includes the image resolution. The accuracy of search information can be reduced as the resolution becomes lower.

The "temporal resolution" includes an image update speed (frame update rate). The accuracy of search information can be reduced as the frame update rate becomes lower.

The "size of search area" includes the size of a search area reflected to an image. The accuracy of the search information can be reduced as the size of the search area becomes smaller.

The "shape of search area" includes a mask pattern (solid pattern) subjected to an image of the search area. The accuracy of search information can be reduced as the area of the solid pattern becomes larger.

According to the above-mentioned embodiment, the player can recognize search information with the same feeling as an actually measured image.

(14) In the information storage medium, when the player or team thereof owns the search item, the search information control means may control the search information supplied to the player or team thereof in accordance with an environment of the operation target of the player or team thereof in the game space.

The "environment" includes whether the position at which the operation target is present is outdoors, whether the position is underground, whether the position is in a tunnel, whether there is an obstacle around, and whether the position is underwater.

According to the above-mentioned embodiment, for example, the search information control means can set the accuracy of search information to be lower when the position at which the operation target is present is outdoors than indoors, set the accuracy of search information to be lower when the position at which the operation target is present is underground than above ground, set the accuracy of search information to be lower when the position at which the operation target is present is in a tunnel than outside a tunnel, and set the accuracy of search information to be lower when the position at which the operation target is present is underwater than on land. In this case, a player can recognize a search item with the same feeling as an existent measurement device (radar).

(15) In the information storage medium, when the player or team thereof owns the search item, the search information control means may change the search information supplied to the player or team thereof in return for charging on the player or team thereof.

According to the above-mentioned embodiment, the player or team thereof can change search information and play a game by paying the cost to a game administrator.

(16) A server device according to one embodiment of the present invention is configured to execute a game in which a player searches for two or more collection items arranged at different positions in a game space and a given event is provided to the player in accordance with a collection result of the collection items,
the server device including:
object arrangement means for arranging a plurality of the collection items and an operation target of the player in the game space;
target control means for controlling movement of the operation target in the game space in accordance with operation input of the player;
object giving means for giving, when the player has established a given positional condition between each of the collection items and the operation target in the game space, the player the collection item or a chance to acquire the collection item;

result management means for managing a collection result of the collection items by the player in association with the operation target of the player;

search information generation means for setting a search area that moves in the game space in accordance with the movement of the operation target, and generating information on presence/absence or a position of each of the collection items in the search area, as search information supplied to the player;

search information control means for controlling the search information supplied to the player in accordance with the collection result of the collection items by the player; and provision control means for controlling the provision of the given event to the player in accordance with the collection result of the collection items by the player.

According to the above-mentioned embodiment, when executing a game in which a player searches for two or more collection items arranged at different positions in a game space and a given event is provided to the player in accordance with a collection result of the collection items, a search area that moves in the game space in accordance with the movement of an operation target of the player in the game space is set, and information on the presence/absence or the position of the collection item in the search area is generated as search information supplied to the player. In this case, by employing the configuration in which search information that can be obtained by the player changes in accordance with a collection result of the collection items by the player, for example, the difficulty level of searching can be appropriately controlled by providing a change such as increase or suppression in difficulty level of searching as the collection of collection items progresses. Consequently, a game having effectively improved attractiveness of searching of a collection item for receiving the provision of a given event can be provided.

Embodiments of the present invention are described below. The embodiments described below are not intended to unduly limit the contents of the present invention described in the scope of claims. Not all of the configurations described in the following embodiments are essential constitutional elements of the present invention.

1. Game System

First, the outline and the schematic configuration of a game system 1 according to one embodiment of the present invention is described with reference to FIG. 1. FIG. 1 is a diagram illustrating an example of the configuration of the game system 1. As illustrated in FIG. 1, the game system 1 is configured such that a server device 10 for providing a game service and terminal devices 20 (for example, terminal devices 20A, 20B, and 20C) can be connected to the Internet (example of network).

By accessing the server device 10 from the terminal device 20, a user can play a game transmitted from the server device 10 through the Internet. By accessing the server device 10 from the terminal device 20, the user can communicate with other users.

The server device 10 is an information processing device capable of providing a service allowing a user to play a game through the terminal device 20 communicably connected to the server through the Internet. The server device 10 may function as an SNS server for providing a communication service. The SNS server may be an information processing device configured to provide a service capable of providing communications among a plurality of users.

When the server device 10 functions as an SNS server, for example, the server device 10 can provide a game called "social game", which is executed by using operation environments (such as application programming interface (API) and platform) of an SNS to be provided.

In particular, the server device 10 can provide games provided on a web browser of the terminal device 20, for example, browser games developed by various languages including HTML, FLASH, CGI, PHP, shockwave, Java (registered trademark) applet, and JavaScript (registered trademark) (games designed to start simply by opening their installation sites on web browser).

The social games include games that can be used only with a web browser and an SNS account without needing dedicated client software, unlike existing online games. The server device 10 has a configuration capable of providing online games where users can make a connection to terminals (such as smartphone, personal computer, and game machine) of other users through a network and share the same game progress simultaneously online.

The server device 10 may be configured by a single (device or processor) or by a plurality of (devices or processors).

Information such as charge information and game information stored in a storage area (storage unit 140 described later) in the server device 10 may be stored in a database (storage device or memory in broad sense) connected through a network (intranet or Internet). When the server device 10 functions as an SNS server, information such as user information 146 stored in the storage area may be stored in a database (storage device or memory in broad sense) connected through a network (intranet or Internet).

Specifically, the server device 10 receives input information based on operation of a user (that is, a player who executes a game) transmitted from the terminal device 20, and performs game processing on the basis of the received input information. The server device 10 transmits game processing results to the terminal device 20, and the terminal device 20 performs various kinds of processing for providing the game processing results received from the server device 10 to the terminal device 20 such that the game processing results can be viewed by the user.

The terminal device 20 is an information processing device such as a smartphone, a mobile phone, a PHS, a computer, a game device, a PDA, a portable game machine, and an image generation device, and is a device that can be connected to the server device 10 through a network such as the Internet (WAN) and a LAN. Communication lines between the terminal device 20 and the server device 10 may be wired or wireless.

The terminal device 20 includes a web browser allowing a user to view web pages (HTML format data). Specifically, the terminal device 20 has a communication control function for performing communication with the server device 10 and a web browser function for controlling display by using data (such as web data and data produced in HTML format) received from the server device 10, and is configured to execute various kinds of processing for providing game screens to the user such that a game is executed by the user. The terminal device 20 may acquire game control information provided from the server device 10, execute predetermined game processing, and execute a game based on the game processing.

Specifically, when the terminal device 20 makes a request to perform a predetermined game to the server device 10, the terminal device 20 is connected to a game site in the server device 10, and the game is started. In particular, the terminal device 20 is configured to use API as necessary to cause the server device 10 functioning as an SNS server to perform predetermined processing or cause the server device 10 to acquire user information 146 managed by the server device 10 functioning as an SNS server to execute a game.

2. Server Device

Figure 2:
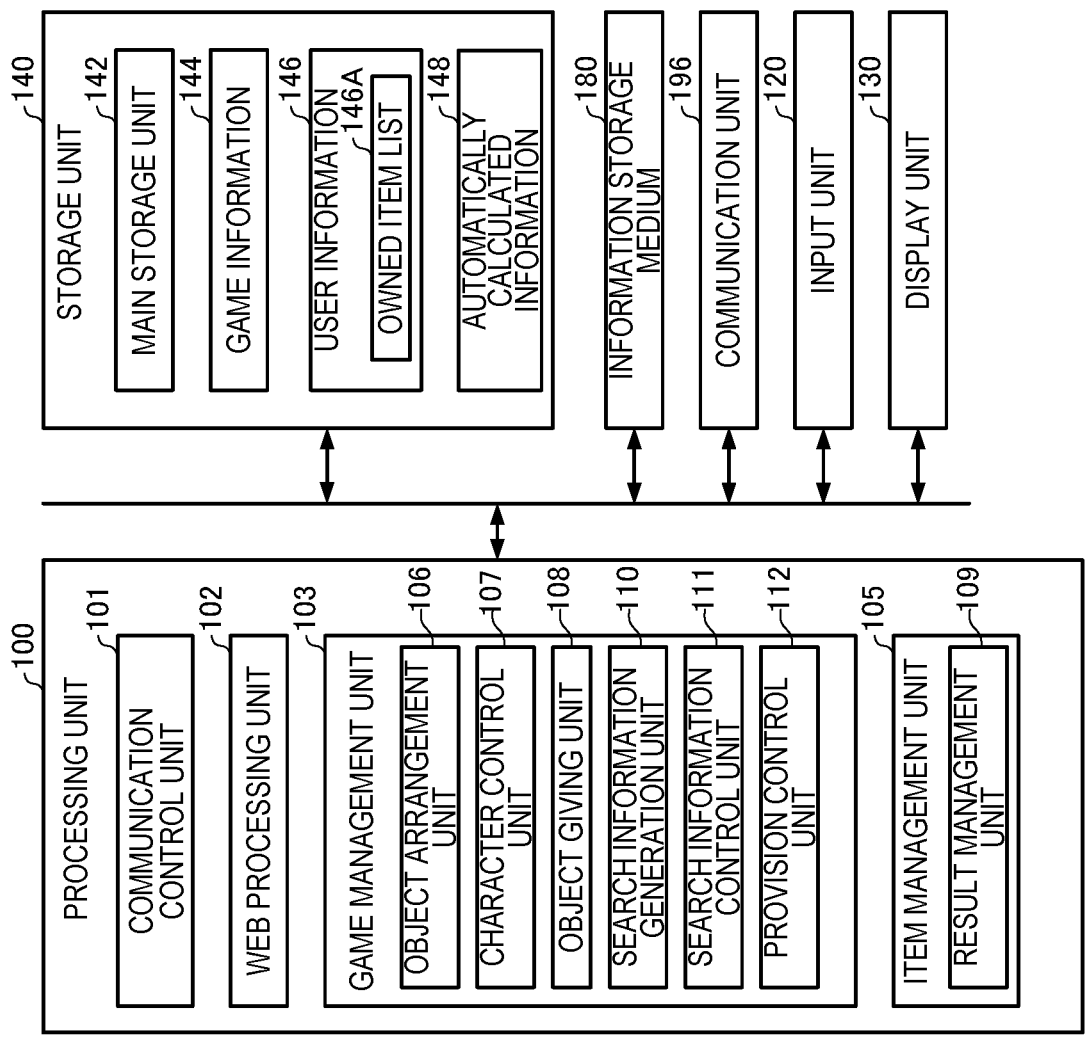
FIG. 2 is a function block diagram illustrating an example of a server device according to one embodiment of the present invention.

Next, the server device 10 in this embodiment is described with reference to FIG. 2. FIG. 2 is a function block diagram of the server device 10. The server device 10 may omit a part of the components (units) in FIG. 2.

The server device 10 includes an input unit 120 used for input by an administrator (operator) or others, a display unit 130 configured to perform predetermined display, an information storage medium 180 having predetermined information stored therein, a communication unit 196 configured to communicate with the terminal devices 20 and others, a processing unit 100 configured to mainly execute processing related to a game to be provided, and a storage unit 140 having stored therein various kinds of data mainly used for the game.

The input unit 120 is used for a system administrator to input settings for games, other necessary settings, and data. For example, the input unit 120 is configured by a mouse or a keyboard.

The display unit 130 displays an operation screen for a system administrator. For example, the display unit 130 is configured by a liquid crystal display.

The information storage medium 180 (computer-readable medium) stores programs and data therein, and its function is implemented by an optical disc (CD, DVD), a magneto-optical disk (MO), a magnetic disk, a hard disk, magnetic tape, or a memory (ROM).

The communication unit 196 performs various kinds of control for communicating with the outside (for example, terminal, another server, or another network system), and its function is implemented by hardware such as various kinds of processors or communication ASICs or programs.

The storage unit 140 serves as a work area for the processing unit 100 or the communication unit 196, and its function is implemented by a RAM (VRAM). Information stored in the storage unit 140 may be managed by a database.

The storage unit 140 stores therein game information 144 indicating information on games to be provided, user information 146 including information on items owned by each user and indicating information on users as players in games to be provided, automatically calculated data (automatically calculated information) 148 generated by game processing described later, and other various kinds of information necessary for game calculation.

For example, the items are an example of contents virtually present on a game (that is, digital contents), and, specifically, are characters such as player characters, items themselves such as weapon items owned by each character, currency in a game, tools, and life energy, or virtual game media that define the characters and items and used in a game.

The processing unit 100 performs various kinds of processing by using a main storage unit 142 in the storage unit 140 as a work area. The functions of the processing unit 100 can be implemented by hardware such as various kinds of processors (such as CPU and DSP) and ASIC (such as gate array), and programs.

The processing unit 100 performs various kinds of processing on the basis of programs (data) stored in the information storage medium 180. Specifically, in the information storage medium 180, programs for causing a computer to function as the units in this embodiment (programs for causing computer to execute processing of units) are stored.

For example, the processing unit 100 (processor) controls the entire server device 10 on the basis of programs stored in the information storage medium 180, and performs various kinds of processing including the control of exchange of data among the units. The processing unit 100 further performs processing for providing various kinds of services corresponding to requests from the terminal.

Specifically, the processing unit 100 includes at least a communication control unit 101, a web processing unit 102, a game management unit 103, and an item management unit 105.

The communication control unit 101 performs processing for transmitting and receiving data to and from the terminal device 20 through a network. Specifically, the server device 10 performs various kinds of processing on the basis of information received by the communication control unit 101 from the terminal device 20.

In particular, the communication control unit 101 performs processing for transmitting a game screen to the terminal device 20 of a user on the basis of a request from the terminal device 20 of the user.

The web processing unit 102 functions as a web server. For example, the web processing unit 102 performs processing for transmitting data in response to a request from the web browser 211 installed on the terminal device 20 and processing for receiving data transmitted from the web browser 211 of the terminal device 20 through communication protocol such as Hypertext Transfer Protocol (HTTP).

In this embodiment, the case where the server device 10 has the function of an SNS server is described as an example. The server device 10 may be formed as a game server and an SNS server independently. A part of whole of game processing may be performed by the server device 10, and a part of the game processing may be performed by the terminal device 20.

The game management unit 103 sets items including characters and various kinds of items used by each player in a game such as RPG as deck data on the basis of the operation of players input through the terminal device 20, and registers the deck data in the user information 146.

The game management unit 103 automatically calculates each game on the basis of parameters for games (hereinafter also referred to as "game parameter") included in the registered user information 146 to generate automatically calculated data, and stores the automatically calculated data in the storage unit 140 as automatically calculated data (automatically calculated information) 148.

In particular, the game management unit 103 executes game processing in an RPG (including competition part) while controlling a given game executed by each player or executing the management of the game.

Each player acquires the automatically calculated data from his/her own terminal device 20, and reproduce the automatically calculated data by the corresponding terminal device 20 to view competition game with other players.

3. Terminal Device

Figure 3:
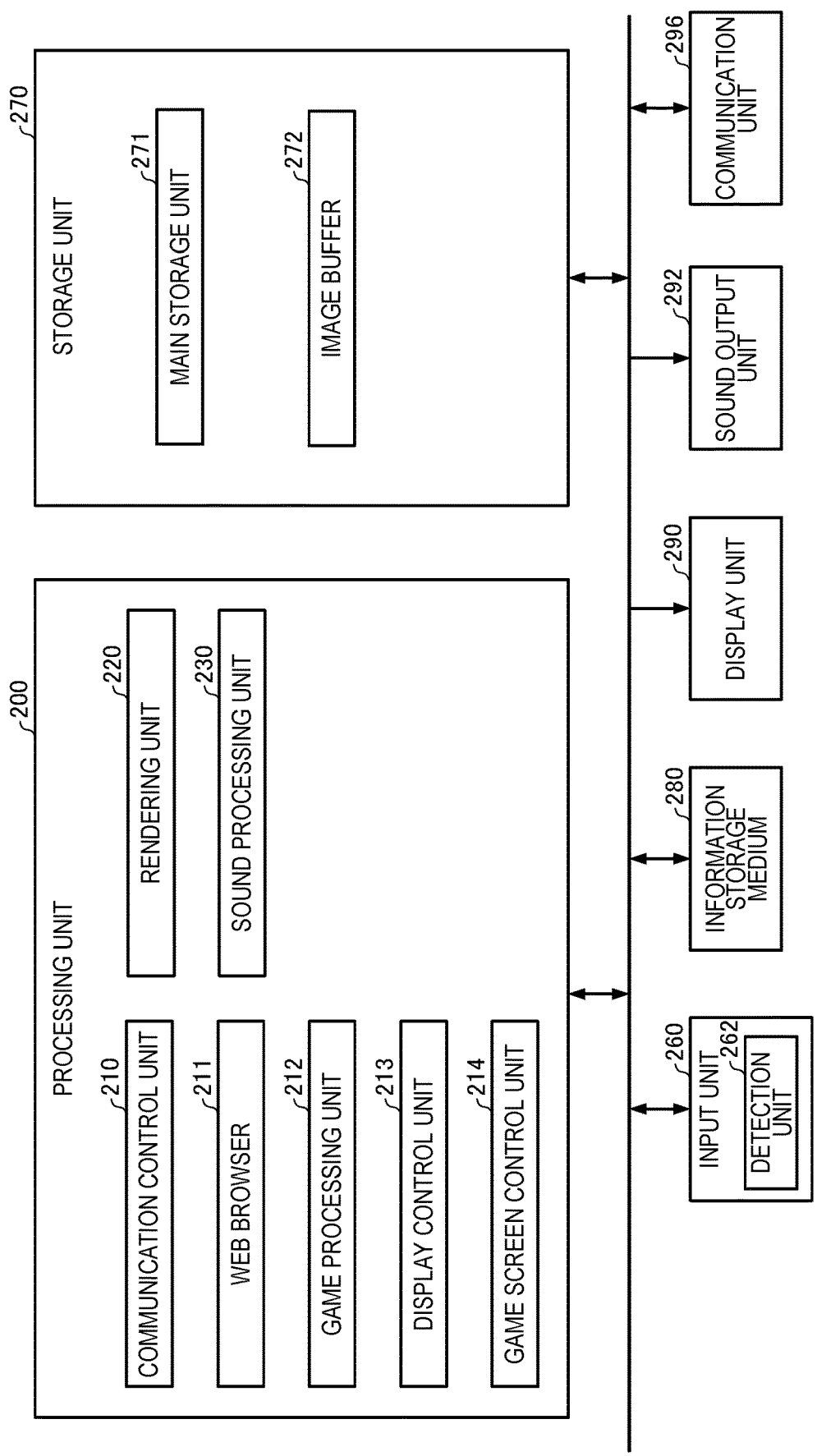
FIG. 3 is a function block diagram illustrating an example of a terminal device according to one embodiment of the present invention.

Next, the terminal device 20 in this embodiment is described with reference to FIG. 3. FIG. 3 is a function block diagram of the terminal device 20. The terminal device 20 may omit a part of the components (units) in FIG. 2.

The input unit 260 is a device for inputting input information from a user, and outputs the input information of the user to the processing unit 200. The input unit 260 includes a detection unit 262 configured to detect input information (input signal) of the user. Examples of the input unit 260 include a lever, a button, a steering, a microphone, a touch panel display, a keyboard, and a mouse.

The storage unit 270 serves as a work area for the processing unit 200 or the communication unit 296, and its function can be implemented by a RAM (VRAM). The storage unit 270 includes a main storage unit 271 used as a work area and an image buffer 272 for storing final display images therein. The storage unit 270 omit a part of these units.

The information storage medium 280 (computer-readable medium) stores programs and data therein, and its function can be implemented by an optical disc (CD, DVD), an magneto-optical disk (MO), a hard disk, magnetic tape, or a memory (ROM).

The processing unit 200 performs various kinds of processing on the basis of programs (data) stored in the information storage medium 280. In the information storage medium 280, programs for causing a computer to function as the units in this embodiment (programs for causing computer to execute processing of units) can be stored.

The communication unit 296 may receive programs and game data for causing a computer to function as the units in this embodiment, which are stored in the information storage medium 180 or the storage unit 140 in the server device 10, through a network, and store the receive programs and data in the information storage medium 280. The programs and data received from the server device 10 may be stored in the storage unit 270. The case where programs and data are received to implement a network system in this manner is also included in the scope of the present invention.

The display unit 290 outputs images generated by the rendering unit 220, and its function can be implemented by a CRT, an LCD, a touch panel display, or a head mount display (HMD). A sound output unit 292 outputs sound generated by the sound processing unit 230, and its function can be implemented by a speaker or headphones.

The communication unit 296 performs various kinds of controls for communication with the outside (for example, another terminal or server), and its function can be implemented by hardware such as various kinds of processors or communication ASIC, or programs.

The processing unit 200 (processor) performs processing such as game processing, display control, image generation processing, or sound generation processing on the basis of input information from the input unit 260 and programs.

The processing unit 200 performs various kinds of processing by using the main storage unit 271 in the storage unit 270 as a work area. The functions of the processing unit 200 can be implemented by hardware such as various kinds of processors (such as CPU and DSP) and ASIC (such as gate array), and programs.

The processing unit 200 includes a communication control unit 210, a web browser 211, a game processing unit 212, a display control unit 213, a game screen control unit 214, a rendering unit 220, and a sound processing unit 230. A part of these units may be omitted.

The communication control unit 210 performs processing for transmitting and receiving data to and from the server device 10. The communication control unit 210 performs processing for storing data received from the server device 10 in the storage unit 270, processing for analyzing the received data, and control processing related to transmission and reception of other data. The communication control unit 210 may perform processing for storing and managing server destination information (IP address, port number) in the information storage medium 280. The communication control unit 210 may communicate with the server device 10 when input information on communication start is received from the user.

The communication control unit 210 performs processing for transmitting user identification information to the server device 10 and receiving data on the user information 146 (such as web page and game screen of user) from the server device 10. For example, the communication control unit 210 performs processing for receiving, from the server device 10, data including information on other users having a friendship with the user (such as names of other users and presentation information on other users).

The communication control unit 210 may transmit and receive data to and from the server device 10 at predetermined cycles, or may transmit and receive data to and from the server device 10 when receiving input information from the input unit 260. The communication control unit 210 may perform processing for receiving a game screen from the server device 10.

The web browser 211 is an application program for viewing web pages (game screens), and downloads HTML files and image files from the web server (server device 10) and analyzing a layout to control display. The web browser 211 transmits data to a web server (server device 10) by using input forms (such as links, buttons, and textboxes).

The web browser 211 can implement a browser game. For example, the web browser 211 may execute a program written by JavaScript (registered trademark), FLASH, or Java (registered trademark) received from the web server (server device 10).

The terminal device 20 can display information from a web server designated by a URL through the Internet on the web browser 211. For example, the terminal device 20 can display a game screen (data such as HTML) received from the server device 10 on the web browser 211.

The game processing unit 212 performs various kinds of game calculation processing. Examples of the game calculation processing include processing for starting a game when a game start condition is satisfied, processing for progressing a game, and processing for finishing a game when a game finish condition is satisfied.

The game processing unit 212 may perform processing for arranging and setting various kinds of objects (objects formed by primitives such as polygons, free-form surfaces, and subdivision surfaces) representing user characters, buildings, stadiums, cars, trees, columns, walls, and maps (geography) in an object space.

The object space as used herein is a virtual space, and includes both of a two-dimensional space and a three-dimensional space. The two-dimensional space is, for example, a space in which objects are arranged in two-dimensional coordinates (X, Y). The three-dimensional space is, for example, a space in which objects are arranged in three-dimensional coordinates (X, Y, Z).

The game processing unit 212 executes game processing including the reproduction of automatically calculated data received from the server device 10.

The display control unit 213 performs processing for displaying game screens generated by the game screen control unit 214 on the display unit 290. For example, the display control unit 213 may display the game screens by using the web browser 211.

The rendering unit 220 performs rendering processing on the basis of various kinds of processing (for example, game processing) performed by the processing unit 200, thereby generating images, and outputs the images to the display unit 290 by the display control unit 213. Images generated by the rendering unit 220 may be so-called two-dimensional images or so-called three-dimensional images.

The sound processing unit 230 performs sound processing on the basis of results of various kinds of processing performed by the processing unit 200 to generate game sounds such as BGM, sound effects, and voices, and outputs the game sounds to the sound output unit 292.

4. Outline

Figure 5:
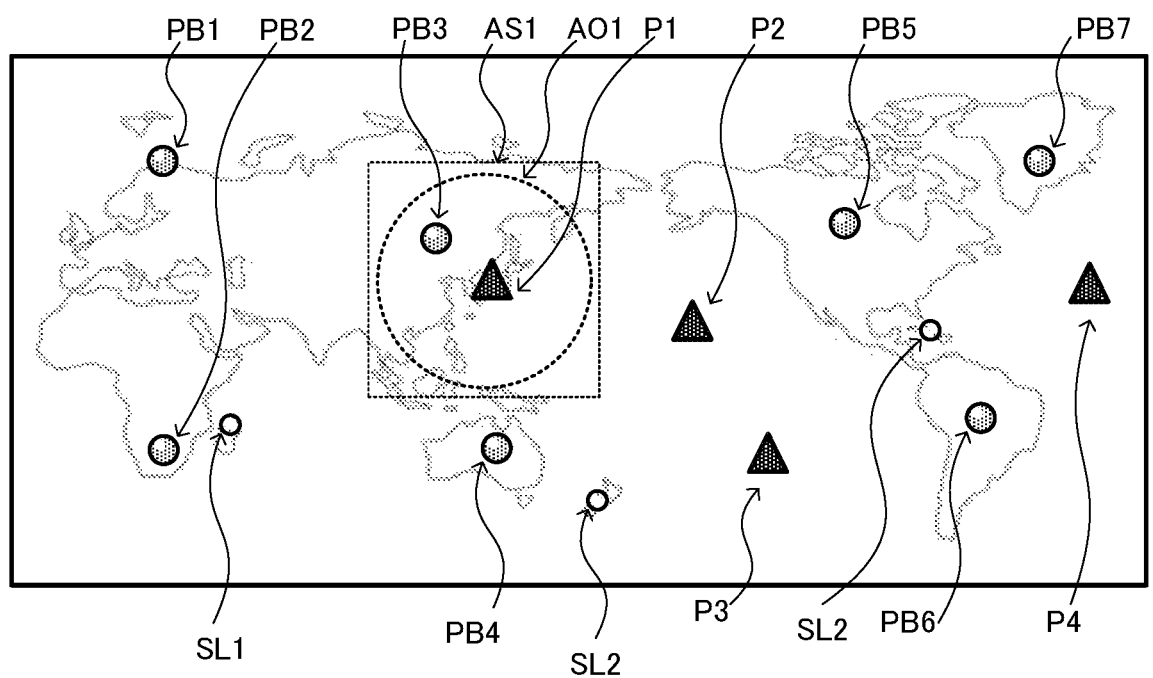
FIG. 5 is an example of a screen displayed on a terminal device of a player according to one embodiment of the present invention.

FIG. 5 is an example of information indicating a positional relation of objects arranged in a game space.

The server device 10 executes a game in which a player searches for two or more collection items PB1 to PB7 arranged at different positions in a game space that is an object space, and a given event is provided to the player in accordance with a collection result of the collection items PB1 to PB7. In FIG. 5, a player character P1 to be operated by the player is illustrated by a triangular mark.

When the game starts, the server device 10 displays the game space (FIG. 5) on the terminal device 20 of the player. The entire game space is not displayed on the terminal device 20 of the player, but a partial area AS1 (FIG. 6) where the player character P1 is present in the game space (FIG. 5) is displayed. In this stage, the collection items PB are not necessarily required to be clearly displayed on the terminal device 20 of the player. The player can move the player character P1 within the game space through the input unit 260. When the player character P1 moves, the area AS1 displayed on the terminal device 20 also moves. The player searches for the collection items PB1 to PB7 scattered in the game space while moving the area AS1 within the game space in this manner.

Thus, the processing unit 100 in the server device 10 functions, as appropriate, an object arrangement unit 106, a character control unit 107 (example of target control means), an object giving unit 108, a result management unit 109, a search information generation unit 110, a search information control unit 111, and a provision control unit 112.

The item management unit 105 functions also as the result management unit 109. The game management unit 103 functions also as the object arrangement unit 106, the character control unit 107, the object giving unit 108, the search information generation unit 110, the search information control unit 111, and the provision control unit 112. The units are described below in sequence.

4.1. Outline of Units

The object arrangement unit 106 arranges a plurality of collection items PB1 to PB7 and a player character P1 to be operated by a player in a game space. In FIG. 5, the player character P1 is illustrated by a triangular mark, but the appearance of the player character P1 displayed on the terminal device 20 of the player may be set so as to be distinguished from the appearances of player characters P2, P3, . . . to be operated by other players.

The character control unit 107 controls the movement of the player character P1 in the game space in accordance with operation input of the player. When the player character P1 moves in the game space, the game management unit 103 moves the area AS1 displayed on the terminal device 20 of the player so as to follow the player character P1. Map information (environmental distribution) on the game space is stored in the storage unit 140 in advance, and the game management unit 103 controls the screen on the terminal device 20 on the basis of the map information. The game management unit 103 may control the screen of the terminal device 20 in a cooperative manner with the display control unit 123 in the terminal device 20.

When a player has established a given positional condition between a collection item PB and the player character P1 in the game space (FIG. 5), the object giving unit 108 gives the player the collection item PB or a chance to acquire the collection item PB.

The result management unit 109 manages an owned item list 146A (FIG. 4), which is a collection result of the collection items PB by the player, in association with the player character P1 of the player. The storage destination of the owned item list 146A (FIG. 4) of the player is user information 146 of the player. In the owned item list 146A (FIG. 4), a player ID, item IDs of one or a plurality of items owned by the player, types of the items, attributes of the items, levels of the items, a team to which the player belongs, a team attribute of the team to which the player belongs, a level of the player, the number of collection items PB collected by the player, and the accuracy of search information to be supplied to the player are written.

The search information generation unit 110 sets a search area AO1 that moves in the game space in accordance with the movement of the player character P1, and generates information on the presence/absence or the positions of collection items PB in the search area AO1 as search information (FIG. 7) supplied to the player.

Figure 7:
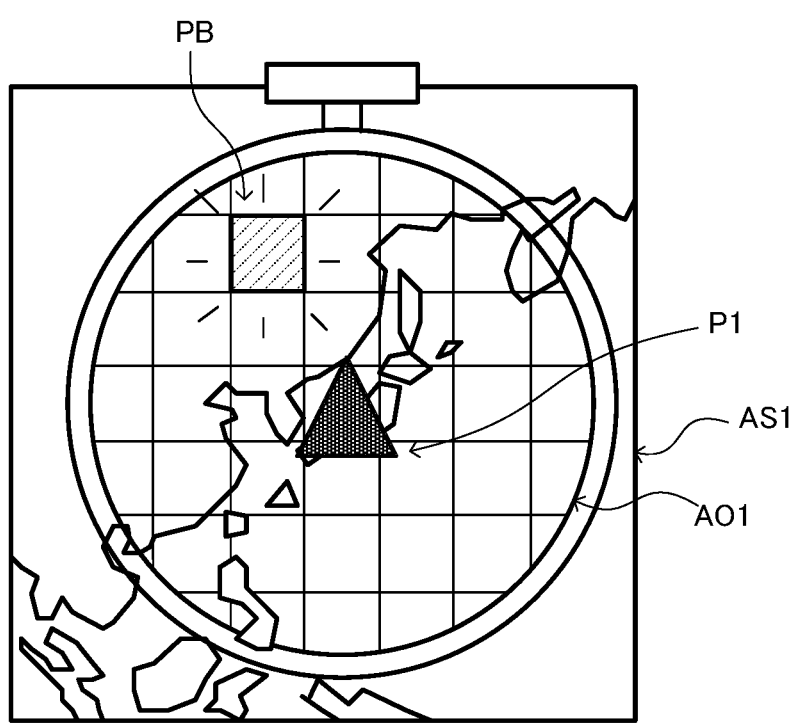
FIG. 7 is a diagram illustrating an example of a display screen of a player who has acquired a radar item in one embodiment of the present invention.
Figure 8:
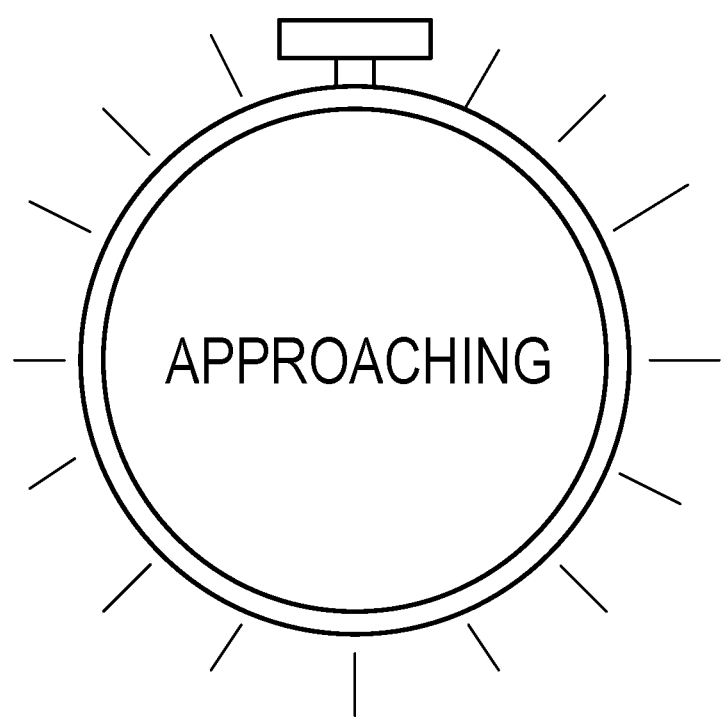
FIG. 8 is a diagram illustrating an example of a display screen when the accuracy of search information is "low" in one embodiment of the present invention.
Figure 9:
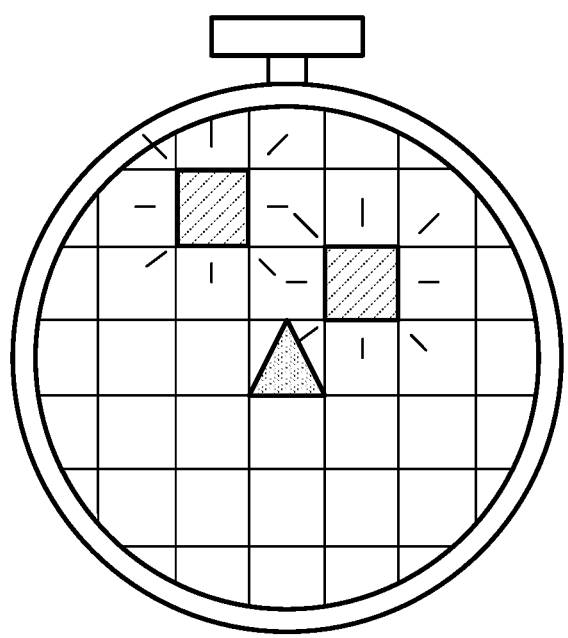
FIG. 9 is a diagram illustrating an example of a display screen when the accuracy of search information is "medium" in one embodiment of the present invention.
Figure 10:
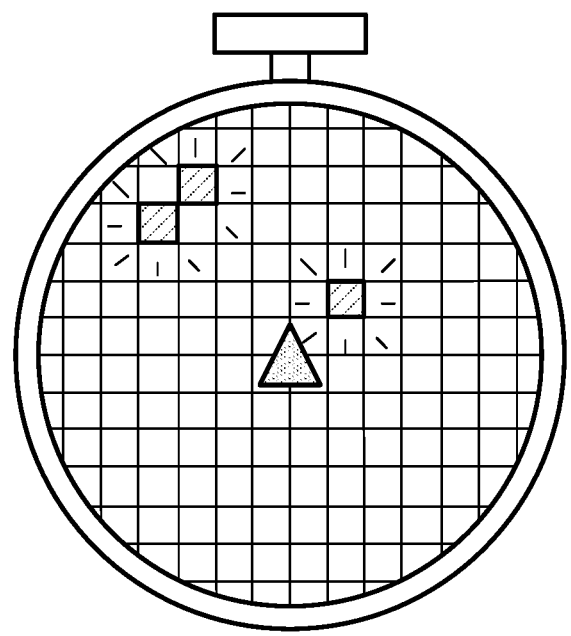
FIG. 10 is a diagram illustrating an example of a display screen when the accuracy of search information is "high" in one embodiment of the present invention.

The search information control unit 111 controls the search information (FIG. 7) supplied to the player in accordance with the collection result (FIG. 4) of collection items PB by the player (hereinafter, the case where "accuracy" in search information is a control target is assumed). The search information control unit 111 adds information indicating the accuracy of search information to be supplied to the player to the owned item list 146A (FIG. 4) of the player. Thus, when the accuracy of the search information for the player is updated, the owned item list 146A (FIG. 4) of the player is updated. FIG. 8, FIG. 9, and FIG. 10 illustrate examples of search information having different accuracies. FIG. 8 is an example of search information whose accuracy is "low", FIG. 9 is an example of search information whose accuracy is "medium", and FIG. 10 is an example of search information whose accuracy is "high".

The provision control unit 112 controls the provision of a given event to the player in accordance with the owned item list 146A (FIG. 4) that is the collection result of collection items PB by the player. In this embodiment, the event is a wishing event (FIG. 11, FIG. 12) as a privilege to the player.

According to the configuration described above, when executing a game in which a player searches for two or more collection items PB arranged at different positions in the game space (FIG. 5) and a given event is provided to the player in accordance with the item list (FIG. 4) that is a collection result of the collection items PB, the search area AO1 that moves in the game space (FIG. 5) in accordance with the movement of the player character P1 in the game space is set, and information on the presence/absence or the position of the collection item PB in the search area AO1 is generated as search information (FIG. 8, FIG. 9, FIG. 10) supplied to the player. In this case, by employing the configuration in which the accuracy (FIG. 8, FIG. 9, FIG. 10) of search information that can be obtained by the player changes in accordance with the item list (FIG. 4) that is the collection result of the collection items PB by the player, for example, the difficulty level of searching can be appropriately controlled by providing a change such as increase or suppression in difficulty level of searching as the collection of collection items PB progresses. Consequently, a game having effectively improved attractiveness of searching of a collection item for receiving the provision of a given event can be provided.

4.1.1. Explanation of Terms, Etc.

The "game space" includes an object space where the player character P1 of the player is arranged. When the game space (FIG. 5) is a real space, the player himself/herself moves in the real space, and the player searches for collection items PB virtually scattered in the real space. In this case, the position of the player is measured with a GPS sensor installed on the terminal device 20 instead of the position of the player character P1. In this embodiment, however, it is assumed that the game space (FIG. 5) is an object space (virtual space).

The "collection item PB" is an item such as a treasure object. In the example in FIG. 5, the collection item PB is a spherical object.

The "collection result" includes the number of collected collection items PB, collection speed, and a combination of attributes of collected collection items PB. In this embodiment, the number of collected collection items PB is managed as a main collection result (major part in owned item list 146A) (FIG. 4).

The "player character P1" includes a mobile object that moves in the game space (FIG. 5), a player character (including an avatar of the player) that moves in the game space, and a pointer or a cursor that moves in the game space. In the example in FIG. 5, the player character P1 is illustrated by a triangular mark. A possible case is that when a player carrying the terminal device 20 moves in a real space, an operation target (such as avatar) moves in a game space while following the player. In this case, the player can feel as if the real space was the game space. In the terminal device 20, a device (such as GPS receiver) for detecting position coordinates of the player in the real space is mounted.

The "positional condition" includes a condition that the collection item PB and the player character P1 contact each other, a condition that the player character P1 is located in a predetermined area associated with the collection item PB, and that a distance between the collection item PB and the player character P1 becomes less than a threshold.

The "acquisition chance" includes a lottery event in which a collection item PB is given to a player by lottery, a game event in which a collection item PB is given to a player when the player has satisfied an acquisition condition, a game event for competing against another player for betting a collection item PB, a game event for competing against a computer for betting a collection item PB, and a game event for competing for a collection item PB against another player owning the collection item PB.

The "search information" includes text information, blinking pattern, and map information indicating the presence/absence or positions of collection items PB. The search information illustrated in FIG. 8 is formed by a combination of text information and a blinking pattern, the search information illustrated in FIG. 9 is formed by coarse map information, and the search information illustrated in FIG. 10 is formed by detailed map information.

The "control of search information" includes control of the presence/absence of search information, the spatial resolution, the temporal resolution, the size of the search area AO1, and the shape of the search area AO1 (that is, control of accuracy of search information). The spatial resolution is different among the search information illustrated in FIG. 8, the search information illustrated in FIG. 9, and the search information illustrated in FIG. 10. In particular, in FIG. 9 and FIG. 10, the interval of scales and the size of marks are different, but the smallness of the interval of scales and the size of marks indicate the largeness of the resolution.

4.2. Collection of Items

Item collection by a player is described below.

Figure 6:
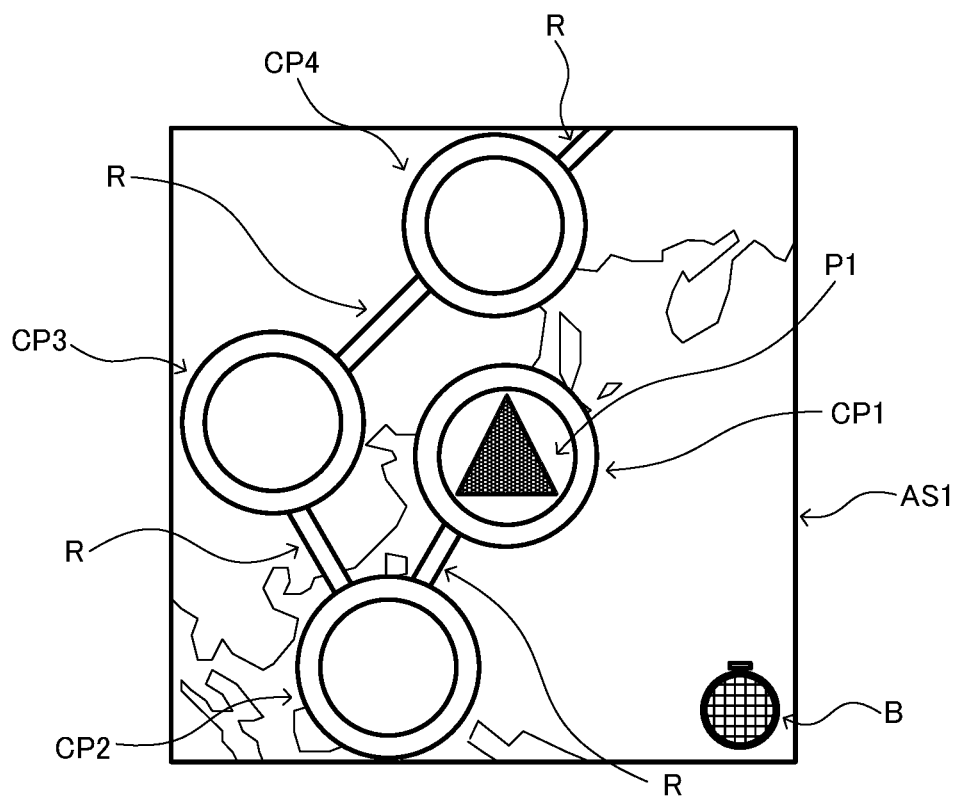
FIG. 6 is another example of the screen displayed on the terminal device of the player according to one embodiment of the present invention.

FIG. 6 illustrates an enlarged screen of the partial area AS1 in the game space (FIG. 5). The area AS1 is an area centered around the player character P1. In the area AS1, a route R is laid out.

The player can move the player character P1 along the route R by operating the input unit 260. Points CP1, CP2, . . . are provided at respective positions on the route R, and the points CP1, CP2, . . . are each associated with a predetermined mini event. Information on the association between the points CP1, CP2, . . . and the mini events is stored, for example, in the game information 144 in advance.

When the player character P1 reaches a given point CP, the game management unit 103 gives the player a chance to play a mini event (such as fighting game, lottery event) associated with the point CP. When the player plays the mini event and establishes a finish condition of the mini event, the game management unit 103 allows the player character P1 to move from the point CP to the next point CP.

For example, when the player character P1 reaches a given point CP, the game management unit 103 gives the player a chance to play a fighting game where the player character P1 and an enemy character fight as a mini event associated with the point CP. When the player character P1 defeats the enemy character, the game management unit 103 eliminates the enemy character from the game space, and adds a collection item PB to the owned item list 146A of the player. In other words, the player can play a fighting game to compete for betting a collection item PB.

For example, when the player character P1 reaches another given point CP, the game management unit 103 gives the player a chance to play a dungeon game as a mini event associated with the point CP. When the player character P1 approaches an item arranged in a dungeon, the game management unit 103 adds the item to the owned item list 146A of the player. When the player character P1 clears (completes) a dungeon game, the game management unit 103 adds a collection item PB to the owned item list 146A of the player. In other words, the player can play a dungeon game in order to acquire the collection item PB and other items.

For example, when the player character P1 reaches another given point CP, the game management unit 103 gives the player a chance to participate in a lottery event as a mini event associated with the point CP. The items are items that can be used in the game space. The game management unit 103 executes lottery processing on the basis of candidates of items to be given by lottery and the lottery provability set to the items, and adds an item that is at least one of the candidates to the owned item list 146A of the player. Information on association between the item and the lottery probability is stored in the game information 144 in advance, for example.

As described above, the player collects collection items PB and other items arranged in the game space (FIG. 5) while moving the player character P1 in the game space (FIG. 5).

4.3. Acquisition of Search Item

In the server device 10, the object arrangement unit 106 further arranges search items SL1, SL2, . . . necessary for players to receive the supply of search information in the game space as items that can be used in the game space.

When a player has established a given positional condition between a search item SL and the player character P1, the object giving unit 108 gives the player the search item SL or a chance to acquire the search item SL. The result management unit 109 further manages an owned item list 146A (FIG. 4), which is a collection result of search items SL by a player, in association with the player character P1 of the player. The search information control unit 111 controls the accuracy of search information supplied to the player (FIG. 8, FIG. 9, FIG. 10) in accordance with the collection result (FIG. 4) of search items SL by the player. In FIG. 5, the search items SL1, SL2, . . . are illustrated by circular marks.

Examples of the "search item SL" include a radar item, a sonar item, and a sensor item. At the lower right of the screen in FIG. 6, an icon B indicating that the player owns a search item SL is displayed. When the player taps the icon B, for example, search information illustrated in FIG. 7 is displayed on an image of the area AS1 in a superimposed manner. In FIG. 7, a rectangular mark indicated by symbol PB represents the position of a collection item. When the player owns no search item SL (radar item), the icon B is not displayed, and hence the player cannot display the search information (FIG. 7) in a superimposed manner.

The "positional condition" includes a condition that the player character P1 is located at a point CP where a lottery event for a search item SL appears. The "positional condition" includes a condition that the player character P1 is located at a point CP where a dungeon game appears and after the dungeon game is started, a search item SL arranged in a dungeon and the player character P1 contact each other, and a condition that a distance between the search item SL and the player character P1 becomes less than a threshold.

The "acquisition chance" includes a lottery event in which a search item SL is given to a player by lottery, a game event (such as fighting game) in which a search item SL is given to a player when the player has satisfied an acquisition condition, a game event (such as fighting game) for competing against another player for betting a search item (not shown), a game event (such as fighting game) for competing against a computer for betting a search item SL, and a game event (such as fighting game) for competing for a search item SL against another player owning the search item SL.

The "collection result" includes a combination of the presence/absence of acquired search items SL, the number of collected search items SL, collection speed, and attributes of collected search items SL. In this embodiment, at least a part of information written in the owned item list 146A is used as collection results.

According to the configuration described above, by further employing the configuration in which the accuracy of search information supplied to the player is controlled in accordance with the collection result (owned item list 146A) of the search items SL by the player, the search and collection of search items SL and the search and collection of collection items can be associated with each other to further increase the attractiveness of searching of collection items in the game.

4.4. Competition for Collection Item

Now, the case where the number of players is plural is considered. A plurality of players play a game in a common game space by using their own terminal devices 20. In FIG. 5, symbols P1, P2, P3, and P4 represent player characters that are operation targets of different players. The following description focuses on a player who operates the player character P1 (the player), but the same holds true for the other players.

In the server device 10, the game is a competition game where the player or team thereof competes against an opponent for collection results of collection items PB. The team is a team to which the player belongs.

The "opponent" as used herein includes players other than the player, teams other than a team to which the player belongs, and computers. A distinction (team ID) of a team to which the player belongs is added to the owned item list 146A (FIG. 4) of the player. When the player does not belong to any team, information on a team to which the player belongs is not added to the owned item list 146A of the player.

The "competition game" includes a game in which the player competes against another player, a game in which a team to which the player belongs competes against another team, and a game in which the player or a team to which the player belongs competes against a computer. Examples of the competition game include a fighting game in which the player operates his/her own player character P1 to complete for betting a collection item PB against a player character P3 operated by another player. Examples of another player include a player belonging to a team corresponding to an enemy for a team to which the player belongs. When the player defeats another player, the player can take a collection item PB owned by the other player out of the other player, and add the collection item PB to his/her own owned item list 146A (FIG. 4). The player can also play a fighting game with another player for betting an unowned collection item PB arranged in the game space (FIG. 5). The "unowned item" is an item that is not owned by any player.

The configuration described above can provide a game in which the player or a team to which the player belongs competes for collection results of collection items PB among other players or other teams. In particular, when the number of collection items PB present in the game space is set to be finite, the competition among players can be intensified.

4.4.1. Team Creation Processing

Now, team creation processing performed by the server device 10 in a cooperative manner with the terminal device 20 is described.

For example, the player can transmit a request to create a team to the server device 10 through the input unit 260 of his/her own terminal device 20. The player can designate an attribute of the team together with the transmission of the team creation request.

The player can also transmit a request to join an existing team to the server device 10 through the input unit 260 of his/her own terminal device 20.

On the other hand, when receiving the team creation request from the player, the communication control unit 101 in the server device 10 determines a team to which the player belongs, and adds a distinction (team ID) of the team to which the player belongs to the owned item list 146A (FIG. 4) of the player.

When the communication control unit 101 in the server device 10 receives a request to join an existing team from the player, the communication control unit 101 inquires another player who has joined the team of whether to allow the player to newly join the team.

After that, when receiving acceptance from the other player, the communication control unit 101 in the server device 10 controls the player to join the team. Specifically, the server device 10 adds a distinction (team ID) of the team to which the player belongs to the owned item list 146A (FIG. 4) of the player.

The communication control unit 101 in the server device 10 allocates a newly created team a team ID different from that of the existing team. The communication control unit 101 in the server device 10 gives the team a team attribute designated by the player. Examples of the team attribute include an attribute indicating compatibility with another team (distinction of enemy and friend). The team attribute is also added to the owned item list 146A (FIG. 4) of the player together with the team ID.

4.5. Competition for Items

In the server device 10, when the player or team thereof has established a given competition start condition, the object giving unit 108 may give the player or team thereof a chance to play a game in which the player or team thereof competes against an opponent for betting a collection item PB as a chance to acquire a collection item PB.

The "competition start condition" includes a condition that the player or team thereof and an opponent are present in an area (point CP) where a collection item PB is present at the same timing, a condition that both of the player or team thereof and an opponent have accepted a competition, and a condition that the player or team thereof and an opponent are "enemies". Whether a player or a team is an "enemy" can be determined, for example, on the basis of the attribute of the player or the team.

For example, the object giving unit 108 sets a condition that "the player and another player who is an opponent are present in an area (point CP) where a collection item PB is present at the same timing, the player and the other player belong to enemy teams, and the player and the other player have accepted a competition" as a competition start condition.

According to the configuration described above, a chance to play a game for competing against an opponent for betting a collection item PB can be given to the player or team thereof as a chance to acquire the collection item PB, and hence a game in which a player or a team to which the player belongs competes for collection results of collection items among other players of other teams while enjoying a competition game for betting a collection item PB can be provided. The competition game is the same as any of publicly known competition games, and hence the description thereof is omitted herein.

4.6. Performance Change of Search Item Depending on Number of Owned Collection Items In the server device 10, the search information control unit 111 controls the accuracy of search information supplied to the player or team thereof in accordance with the number of collection items PB owned by the player or team thereof.

For example, the search information control unit 111 monitors the number of owned collection items PB on the basis of the owned item list 146A (FIG. 4) of the player, and determines whether the number of owned collection items has increased. When the number of owned collection items has increased by one, the search information control unit 111 improves the accuracy of search information added to the owned item list 146A (FIG. 4) by one stage. When the number of owned collection items has decreased by one, the search information control unit 111 reduces the accuracy of search information added to the owned item list 146A (FIG. 4) by one stage. When the number of owned collection items remains unchanged, the search information control unit 111 maintains the accuracy of search information added to the owned item list 146A (FIG. 4). Information on the accuracy after the update of the owned item list is used to display the search information on the terminal device 20 of the player.

According to the configuration described above, the player or team thereof can control the accuracy of search information by his/herself in accordance with the number of acquired collection items PB. Consequently, the player or team thereof can gain advantage on searching of collection items PB by tactically increasing and decreasing the number of owned collection items PB.

4.6.1. Performance Improvement of Search Item at Final Stage of Game

For example, the search information control unit 111 determines whether the player owns a search item SL and counts the number of search items SL in the team on the basis of the owned item list 146A (FIG. 4) of the player and the owned item list 146A (FIG. 4) of another player belonging to the same team as the player.

When the number of collection items PB owned by the team is 1 or 2, the search information control unit 111 sets the accuracy of search information that should be supplied to the player to "low" (FIG. 8).

When the number of collection items PB owned by the team is 3 or 4, the search information control unit 111 sets the accuracy of search information that should be supplied to the player to "medium" (FIG. 9).

When the number of collection items PB owned by the team is 5 or 6, the search information control unit 111 sets the accuracy of search information that should be supplied to the player to "high" (FIG. 10).

The search information control unit 111 reflects the set accuracy to the owned item list 146A (FIG. 4) of the player (updates owned item list 146A). Information on the updated accuracy is used to display the search information on the terminal device 20 of the player.

In this case, as the number of search items SL owned by a team to which the player belongs becomes larger, the player can gain more advantage on searching of collection items PB, and increase the collection speed of collection items PB. The player can increase the degree of contribution to the team to which the player belongs as the number of search items SL owned by the player becomes larger.

4.6.2. Performance Decrease of Search Item at Final Stage of Game

For example, the search information control unit 111 determines whether the player owns a search item SL and counts the number of search items SL in the team on the basis of the owned item list 146A (FIG. 4) of the player and the owned item list 146A (FIG. 4) of another player belonging to the same team as the player.

When the number of collection items PB owned by the team is 1 or 2, the search information control unit 111 sets the accuracy of search information that should be supplied to the player to "high" (FIG. 10).

When the number of collection items PB owned by the team is 3 or 4, the search information control unit 111 sets the accuracy of search information that should be supplied to the player to "medium" (FIG. 9).

When the number of owned collection items PB is 5 or 6, the search information control unit 111 sets the accuracy of search information that should be supplied to the player to "low" (FIG. 8).

The search information control unit 111 reflects the set accuracy to the owned item list 146A (FIG. 4) of the player (updates owned item list 146A). Information on the updated accuracy is used to display the search information on the terminal device 20 of the player.

In this case, the searching of collection items PB becomes more difficult as the number of search items SL owned by a team to which the player belongs becomes larger, and hence the player can share a situation that "the difficulty level of the game increases with the progress of the game" among friends in the team.

4.7. Interference Among Search Items

In the server device 10, when the player or team thereof owns a search item SL, the search information control unit 111 may controls the accuracy of search information supplied to the player or team thereof in accordance with at least one of a distance from the player character P1 of the player or team thereof to the player character P2 of another player or a team thereof owning the search item SL and the number of other players or teams thereof.

According to the configuration described above, when the player or team thereof each has a search item SL, the player can be given a feeling as if the player was interfered (obstructed) by a search item SL of another player or team. Thus, the player or team thereof owning a search item SL can gain advantage on the searching of collection items PB by tactically performing at least one of formation and power increase of the player character P1.

For example, the search information control unit 111 determines whether the player owns a search item SL on the basis of the owned item list 146A (FIG. 4) of the player.

When the player owns a search item SL, the search information control unit 111 detects one or a plurality of other players pi who belong to a team that is an enemy against a team to which the player belongs and own a search item SL on the basis of the owned item lists 146A of other players.

In addition, the search information control unit 111 measures a distance di from the player character P1 of the player to a player character Pi of another player pi in the game space, and converts the distance di into a larger coefficient Di as the distance di becomes smaller. When there are a plurality of other players pi, the measurement of the distance di and the conversion into the coefficient Di are performed for each of the plurality of other players.

The search information control unit 111 calculate the sum $\Sigma Di$ (i=1, 2, . . . ) of the coefficients Di of the other players pi (i=1, 2, . . . ), and sets the accuracy of search information supplied to the player to be lower as the sum $\Sigma Di$ becomes larger.

The search information control unit 111 reflects the set accuracy to the owned item list 146A (FIG. 4) of the player (updates owned item list 146A). Information on the updated accuracy is used to display search information on the terminal device 20 of the player.

As a result, the accuracy of search information supplied to the player decreases as the number of other players that are enemies owning a search item SL becomes larger and the distance from the player character P1 to another player character Pi becomes smaller. Consequently, the player can be given a feeling that "performance of search item SL owned by his/herself is reduced when receiving interference from a search item SL of another player who is an enemy (performance is weakened by each other, performance suffers from radio disturbance)".

4.8. First Effect of Team Creation

In the server device 10, when the player owns a search item SL and has created a team with another player owning a search item SL, the search information control unit 111 may change the accuracy of search information supplied to the player.

According to the configuration described above, a player owning a search item SL can change the accuracy of his/her own search information by creating a team with another player owning a search item SL. Consequently, the player owning the search item SL can gain advantage on searching of collection items PB by tactically organizing a team.

4.9. Second Effect of Team Creation

In the server device 10, when a player owns a search item SL, the search information control unit 111 may control the accuracy of search information supplied to the player in accordance with the number or type of search items SL owned by the entire team to which the player belongs or a combination thereof.

According to the configuration described above, a player owning a search item SL can change the accuracy of his/her own search information by getting involved in acquisition of a search item SL by another player belonging to the same team as the player to change the number or type of search items SL owned by the entire team or a combination thereof. Consequently, the player owning the search item SL can gain advantage on searching of collection items by tactically cooperating in the same team. Examples of the "type" include dependency of performance on environments. For example, a difference is provide such that a search item SL (radar item) of a particular type A is superior in performance in a boggy area, and a search item SL (radar item) of a different type C is superior in performance on a land.

For example, the search information control unit 111 may provide the terminal device 20 of a player or a team owning both of a search item SL (radar item) of a particular type A and a search item SL (radar item) of a different type C with another world that cannot be seen only with one search item SL (radar item) (such as another world that cannot be seen with visible light, another world that can be seen only with an infrared camera, another world that can be seen only with X rays, and a micro world that can be seen only with a microscope) as search information.

4.9.1. Specific Example of Effects of Team Creation

For example, the search information control unit 111 determines whether the player owns a search item SL on the basis of the owned item list 146A (FIG. 4) of the player.

When the player owns a search item SL, the search information control unit 111 monitors information on a team to which the player belongs, which is added to the owned item list 146A (FIG. 4) of the player, to determine whether the player has created a team.

When the player has created a team, the search information control unit 111 determines whether another player owns a search item SL on the basis of the owned item list 146A (FIG. 4) of one or a plurality of other players belonging to the team, and counts the number of other players belonging to the team and owning a search item SL.

The search information control unit 111 improves the accuracy of search information supplied to the player in accordance with the number of players owning the search item SL.

As a result, the accuracy of search information supplied to the player improves as the number of other players belonging to the same team as the player and owning a search item SL becomes larger. Consequently, the player can be given a feeling that "performance of a search item owned by the player improves while linking to data on search items SL of friendly players (performance increases by each other, data-link effect appears)".

4.10. Performance Change Depending on Number of Enemies or Number of Friends In the server device 10, when the player or team thereof owns a search item SL, the search information control unit 111 may control the accuracy of search information supplied to the player or team thereof in accordance with an attribute of the player or team thereof, an attribute of another player or a team thereof owing a search item SL, and the number of other players or teams thereof.

According to the configuration described above, when the player or team thereof owns a search item SL, the player can be given a feeling as if the player was interfered (obstructed) by a search item SL of another player or team. Consequently, a player or a team thereof owning a search item SL can gain advantage on searching of collection items PB, for example, by tactically increasing forces (increasing the number of friends).

For example, the search information control unit 111 determines whether the player owns a search item SL on the basis of the owned item list 146A (FIG. 4) of the player.

When the player owns a search item SL, the search information control unit 111 detects, on the basis of the owned item lists 146A of other players, one or a plurality of other players pi who belong to a team that is an enemy against a team to which the player belongs and own a search item.

The search information control unit 111 counts the number of other players pi (i=1, 2, . . . ), and sets the accuracy of search information supplied to the player to be lower as the number of other players pi becomes larger.

The search information control unit 111 reflects the set accuracy to the owned item list 146A (FIG. 4) of the player (updates owned item list 146A). Information on the updated accuracy is used to display search information on the terminal device 20 of the player.

As a result, the accuracy of search information supplied to the player reduces as the number of other players that are enemies owning search items SL. Consequently, the player can be given a feeling that "performance of search item SL owned by his/herself is reduced when receiving interference from a search item SL of another player who is an enemy (performance is weakened by each other, performance suffers from radio disturbance)".

4.11. Communication Depending on Search Item

In the server device 10, the communication control unit 101 may further include a communication management unit configured to manage, when the player or team thereof owns a search item SL, communication performed between the player or team thereof and another player or a team thereof owning a search item SL.

According to the configuration described above, when a plurality of players or a team thereof each have a search item SL, communication can be performed among the players or team thereof. Thus, for example, a player or a team thereof owning a search item SL can exchange search information around him/her (them) with other players or teams, and hence can gain advantage on the progress of searching of collection items.

For example, the communication management unit in the server device 10 determines whether the player owns a search item SL on the basis of the owned item list 146A (FIG. 4) of the player.

When the player owns a search item SL, the search information control unit 111 detects one or a plurality of other players pi owning a search item SL on the basis of the owned item lists 146A of other players.

Next, the communication management unit in the server device 10 displays the fact that the player can communicate with one or a plurality of other players pi on the terminal device 20 of the player.

Next, the player transmits a communication request to the server device 10 through the input unit 260 of his/her own terminal device 20, and designates a desired player from among one or a plurality of other players pi.

Next, the player inputs a message (text data) for the designated player to the terminal device 20 through the input unit 260 of his/her own terminal device 20. The input message (text data) is transmitted to the server device 10.

Next, when the communication management unit in the server device 10 receives the message (text data) from the player, the communication management unit transmits the received message (text data) to the terminal device 20 of the designated player. The message (text data) is displayed on the terminal device 20 of the designated player.

4.12. Performance Change Depending on Player Level

In the server device 10, the result management unit 109 may further manage a parameter set to the player or team thereof, and when the player or team thereof owns a search item SL, the search information control unit 111 may control the accuracy of search information supplied to the player or team thereof in accordance with the parameter of the player or team thereof.

The "parameter" includes an attribute and a level.

According to the configuration described above, when the player or team thereof each has a search item SL, the accuracy of search information changes depending on a parameter of the player or team thereof. Consequently, the player or team thereof owning a search item SL can change the accuracy of search information by changing the parameter of the player or team thereof.

For example, the search information control unit 111 determines the level of the player on the basis of the owned item list 146A (FIG. 4) of the player. The search information control unit 111 sets higher accuracy of search information supplied to the player as the level of the player becomes higher.

The search information control unit 111 reflects the set accuracy to the owned item list 146A (FIG. 4) of the player, and updates the owned item list 146A (FIG. 4). Information on the updated accuracy is used to display the search information on the terminal device 20 of the player.

As a result, the accuracy of search information supplied to the player improves as the level of the player becomes higher. Consequently, the player can be given a feeling that "performance of a search item SL owned by his/herself improves along with his/her own level".

4.13. Conditions of Team Creation

In the server device 10, the processing unit 100 may further include a limiting unit configured to limit team creation or team joining by the player when the player has not established a given collection condition for the collection result of the collection item PB.

The "collection condition" includes a condition that the player owns a predetermined number or more of collection items PB.

According to the configuration described above, team creation or team joining by the player is limited in accordance with the collection result of collection items PB by the player, and hence a gap (feeling of inequality) among players in the same team can be reduced.

For example, the limiting unit in the server device 10 determines whether a team creation request or a team join request has been received from the terminal device 20 of the player. When the team creation request or the team join request has been received, the limiting unit refers to the owned item list 146A (FIG. 4) of the player to count the number of collection items PB owned by the player.

When the number of owned collection items PB has not reached a predetermined threshold, the limiting unit in the server device 10 displays the fact that a creation request and a join request are not accepted on the terminal device 20 of the player.

When the number of owned collection items PB has reached the predetermined threshold, the limiting unit in the server device 10 accepts the creation request and the join request. The team creation processing is as described above. The team join processing is basically the same as the team creation processing except that a team to which the player belongs is an existing team.

4.14. Pattern of Search Information

In the server device 10, the search information may include at least one of information on the presence/absence of a collection item PB in the search area AO1, information on the position of the collection item PB in the search area AO1, and information on suggestion of the position of the collection item PB in the search area AO1. Search information illustrated in FIG. 8 indicates the presence/absence of a collection item PB in the search area AO1. Search information illustrated in FIG. 9 or FIG. 10 indicates the positions of collection items PB in the search area AO1.

The "presence/absence of collection item PB" can be presented to the player by hue, luminance, or a blinking pattern. For example, the search information control unit 111 displays the search information illustrated in FIG. 8 on the terminal device 20 of the player, and when a collection item PB is present in the search area AO1, blinks the luminance of the screen with a first blinking pattern, and when no collection item PB is present in the search area AO1, blinks the luminance of the screen with a second blinking pattern (for example, a steady pattern).

The "position of collection item PB" can be presented to the player by a two-dimensional map or a three-dimensional map. For example, the search information control unit 111 displays a two-dimensional map of a search area AO1 including a player character P1 as illustrated in FIG. 6 on the terminal device 20 of the player, and maps the collection item PB on the map as illustrated in FIG. 7. Thus, the player can intuitively grasp the positional relation between the player character P1 and the collection item PB.

The "suggestion of position of collection item PB" includes information such as a hint indicating the position of the collection item PB. For example, as illustrated in FIG. 8, the search information control unit 111 displays a text indicating whether the player character P1 is approaching a collection item PB on the terminal device 20 as one type of hint.

The search information control unit 111 may display a text "approaching" on the screen when the player character P1 is approaching a collection item PB, and may hide the text (corresponding to minimum accuracy) when the player character P1 is being away from the collection item PB.

The search information control unit 111 may differ the blinking pattern of the screen between when the player character P1 is approaching a collection item PB and when the player character P1 is being away from the collection item PB. For example, the search information control unit 111 blinks the screen at a relatively high frequency when the player character P1 is approaching a collection item PB, and blinks the screen at a relatively low frequency when the player character P1 is being away from the collection item PB.

The search information control unit 111 may change a sound generation pattern of notification sound in place of changing the blinking pattern of the screen or in addition to changing the blinking pattern of the screen. The notification sound can be output from the sound output unit 292.

According to the configuration described above, the player can use a search item SL as an index for searching for a collection item.

4.15. Accuracy of Search Information

In the server device 10, the search information may be information indicating an image of the search area AO1, and the search information control unit 111 may control at least one of the spatial resolution of the image, the temporal resolution of the image, the size of the search area AO1, and the shape of the search area AO1 as the accuracy of the search information.

The "spatial resolution" includes the resolution of an image. The accuracy of search information can be reduced as the resolution becomes lower. The resolution of an image as search information illustrated in FIG. 9 is set higher than the resolution of an image as search information illustrated in FIG. 8. The resolution of an image as search information illustrated in FIG. 10 is set lower than the resolution of the image as search information illustrated in FIG. 9.

The "temporal resolution" includes an image update speed (frame update rate). The accuracy of search information can be reduced as the frame update rate becomes lower. For example, the search information control unit 111 can improve the accuracy of search information by improving the frame update rate of an image serving as the search information while fixing the resolution of the image, and can suppress the accuracy of the search information by reducing the frame update rate. The search information control unit 111 may control the accuracy of the search information by changing a combination of the resolution and the frame update rate.

The "size of search area AO1" includes the size of the search area AO1 reflected to the image. The accuracy of the search information can be reduced as the size of the search area AO1 becomes smaller. For example, the search information control unit 111 can improve the accuracy of search information by increasing the size of the search area AO1 while fixing the resolution and the frame update rate of an image serving as the search information, and can suppress the accuracy of the search information by reducing the size of the search area AO1. The search information control unit 111 may control the accuracy of the search information by changing a combination of the resolution, the frame update rate, and the size of the search area AO1.

The "shape of search area AO1" includes a mask pattern (solid pattern) of mask processing performed on an image of the search area. The accuracy of search information can be reduced as the area of the mask pattern becomes larger. Examples of the image mask processing include processing for masking a part of the image with a predetermined color such as black to intentionally reduce the visibility of the image. For example, the search information control unit 111 can improve the accuracy of search information by reducing the area of a mask in an image serving as the search information while fixing the resolution and the frame update rate of the image and the size of the search area AO1, and can suppress the accuracy of the search information by increasing the area of the mask in the image. The search information control unit 111 may control the accuracy of the search information by changing a combination of the resolution, the frame update rate, the size of the search area AO1, and the area of the mask.

The configuration described above enables the player to recognize search information with the same feeling as an actually measured image. In a radar image, which is an actually measured image, at least one of the resolution, the frame update rate, the size of the search area AO1, and the area of the mask can change depending on the performance of a radar or disturbance.

4.16. Performance Change Depending on Environment

In the server device 10, when the player or team thereof owns a search item SL, the search information control unit 111 may control the accuracy of search information supplied to the player or team thereof in accordance with an environment of the player character P1 of the player or team thereof in the game space (FIG. 5).

The "environment" includes whether the position at which the player character P1 is present is outdoors, whether the position is underground, whether the position is in a tunnel, whether there is an obstacle around, and whether the position is underwater.

According to the configuration described above, for example, the search information control unit 111 can set the accuracy of search information to be lower when the position at which the player character P1 is present is outdoors than indoors, set the accuracy of search information to be lower when the position at which the player character P is present is underground than above ground, set the accuracy of search information to be lower when the position at which the player character P1 is present is in a tunnel than outside a tunnel, and set the accuracy of search information to be lower when the position at which the player character P1 is present is underwater than on land. In this case, the player can recognize a search item SL with the same feeling as an existent measurement device (radar).

For example, the search information control unit 111 determines whether the position at which the player character P1 is present in the game space (FIG. 5) is outdoors or indoors. The search information control unit 111 sets the accuracy of search information when the position at which the player character P1 is present is outdoors to be higher than the accuracy of search information when the position is indoors.

For example, the search information control unit 111 determines whether the position at which the player character P1 is present in the game space (FIG. 5) is above ground or underground. The search information control unit 111 sets the accuracy of search information when the position at which the player character P1 is present is above ground to be higher than the accuracy of search information when the position is underground.

For example, the search information control unit 111 determines whether the position at which the player character P1 is present in the game space (FIG. 5) is in a tunnel. The search information control unit 111 sets the accuracy of search information when the position at which the player character P1 is present is outside a tunnel to be higher than the accuracy of search information when the position is in a tunnel. When the position at which the player character P1 is present is in a tunnel, the search information control unit 111 may hide (corresponding to minimum accuracy) the search information.

For example, the search information control unit 111 determines whether the position at which the player character P1 is present in the game space (FIG. 5) is underwater. The search information control unit 111 sets the accuracy of search information when the position at which the player character P1 is present is not underwater to be higher than the accuracy of search information when the position is underwater. The search information control unit 111 may hide (corresponding to minimum accuracy) the search information when the position is underwater.

4.17. Performance Improvement by Charging

In the server device 10, when the player or team thereof owns a search item SL, the search information control unit 111 may change the accuracy of search information supplied to the player or team thereof in return for charging on the player or team thereof.

According to the configuration described above, the player or team thereof can change search accuracy and play a game by paying the cost to a game administrator.

For example, in the storage unit 140 in the server device 10, charge information (not shown) on the player is stored as one piece of user information on the player. In the charge information on the player, the cost (charge amount) paid to a game administrator (administrator of server device 10) by the player and an item given to the player from the game administrator in return for payment of the cost. The charge information on the player is updated by the game management unit 103 each time charging by the player is performed.

The search information control unit 111 in the server device 10 determines whether the player owns a search item SL on the basis of the item list (FIG. 4) of the player. When the player owns a search item SL, the search information control unit 111 displays the fact that the performance of the search item SL can be improved on the terminal device 20 of the player.

Next, the player transmits a request to improve the performance of the search item SL to the server device 10 through the input unit 260 of his/her own terminal device 20.

Next, the search information control unit 111 in the server device 10 displays the fact that payment of the cost is necessary on the terminal device 20 of the player.

Next, the player executes payment of cost (settlement) by a given method, such as inputting a prepaid card number or inputting a credit card number. When conforming the settlement by a given method through a charging server (not shown), the game management unit 103 in the server device 10 updates the charge information on the player.

Next, when confirming the settlement on the basis of the above-mentioned charge information, the search information control unit 111 in the server device 10 rewrites information on the accuracy of search information to be supplied to the player in the owned item list 146A (FIG. 4) of the player in order to improve the accuracy of the search information. In this case, for example, the search information control unit 111 sets the accuracy to be higher as the cost paid by the player becomes larger.

4.18. Display Change depending on Game Situation

In the server device 10, the result management unit 109 may further manage a game situation of the player or team thereof, and when the player or team thereof owns a search item SL, the search information control unit 111 may control a pattern of the supply to the player or team thereof in accordance with the game situation of the player or team thereof.

The "game situation" includes a level and a friendship. The friendship includes the presence/absence or the number of other players belonging to the same team as the player, and player IDs of one or a plurality of other players belonging to the same team.

The "pattern of supply" includes a display pattern, a sound output pattern, and a vibration pattern. The display pattern includes a display size, a display color, and a display definition.

The configuration described above enables the player or a team to grasp his/her (their) game situation on the basis of the pattern of search information supplied to him/her (them).

4.19. Competition for Timing to Establish Collection Condition

The provision control unit 112 allows the provision of a given event to the player or team thereof when the player or team thereof has established a given collection condition for a collection result of collection items PB earlier than another player or team.

The "collection condition" includes a condition that the player owns a predetermined number of (seven) collection items PB.

According to the configuration described above, the player or team thereof cannot be provided with a given event unless the player or team thereof achieves a collection condition earlier than another player or team. Consequently, the player or team thereof is given a motivation to achieve the collection condition early, and a sense of speed of the game is increased.

4.20. Event Change Depending on Combination of Collection Items

In the server device 10, the result management unit 109 may further manage a parameter set to a collection item PB, and when the player or team thereof has established a given collection condition for a collection result of the collection item PB, the provision control unit 112 may control the provision of a given event to the player or team thereof in accordance with a parameter of a collection item PB owned by the player or team thereof.

The "parameter" includes an attribute and a level.

The "collection condition" includes a condition that the player owns a predetermined number of (seven) collection items PB.

According to the configuration described above, the player or team thereof can change the provision of an event by his/herself by changing the attribute of collected collection items PB.

For example, the result management unit 109 may determine whether the player has collected seven collection items PB on the basis of the owned item list 146A (FIG. 4) of the player. When the player has collected seven collection items PB, the provision control unit 112 may calculate an average value of levels of the seven collection items PB on the basis of the owned item list 146A (FIG. 4), and provide a higher-value event to the player as the average value becomes higher.

For example, when the average value of the levels of the seven collection items PB has exceeded a threshold, the provision control unit 112 may provide the player with a lottery event in which the player is given an item whose reality is a certain degree or higher, and when the average value of the levels of the seven collection items PB has not exceeded the threshold, the provision control unit 112 may provide the player with a lottery event in which the player is given only an item whose reality is a certain degree or lower.

4.21. Condition for Receiving Provision of Event

In the server device 10, when the player or team thereof has established a given collection condition for a collection result of collection items PB and has established a given event start condition, the provision control unit 112 may allow the provision of a given event to the player or team thereof.

The "collection condition" includes a condition that the player owns a predetermined number of (seven) collection items PB.

The "start condition" includes a condition to gather at a designated location (designated point CP) within a time limit.

According to the configuration described above, the player or team thereof cannot be provided with an event unless an event start condition is established. Thus, the player or team thereof can be given a motivation to achieve an event start condition early.

Figure 11:
FIG. 11 is a diagram illustrating an example of a display screen when another player in the same team has accomplished condition in one embodiment of the present invention.

For example, when the player has established a collection condition to collect seven collection items PB, the provision control unit 112 displays an event start condition to "gather at the player character P1 of the player within one minute" on the terminal device 20 of each player belonging to the team (FIG. 11).

After that, the provision control unit 112 determines whether all players belonging to the team have established the event start condition. When all players belonging to the team have established the event start condition, the provision control unit 112 provides an event to all players belonging to the team. Otherwise, the provision control unit 112 does not provide an event to any player belonging to the team. The establishment of such an event start condition requires cooperation of all players in the team, and hence a sense of togetherness in the team can be increased.

4.22. Share Event in Team

In the server device 10, when another player belonging to the same team as the player has established a given collection condition for a collection result of collection items PB and when the player has established a given event start condition, the provision control unit 112 may allow the provision of a given event to the player.

The "collection condition" includes a condition that a player owns a predetermined number of (seven) collection items PB.

The "start condition" includes a condition to gather at a designated location (designated point CP) within a time limit.

According to the configuration described above, a player can be provided with an event simply by establishing a start condition by his/herself when another player belonging to the same team as the player has established a collection condition even when the player has not established the collection condition. Thus, the player is given a motivation to assist the establishment of the collection condition by another player belonging to the same team as the player. Consequently, communication among players belonging to the same team can be activated.

For example, when another player belonging to the same team as the player has established a collection condition to collect seven collection items PB, the provision control unit 112 displays an event start condition to "gather at a player character of the other player within one minute" on the terminal device 20 of the player (FIG. 11).

After that, the provision control unit 112 determines whether the player has established the event start condition. When the player has established the event start condition, the provision control unit 112 provides an event to the player. Otherwise, the provision control unit 112 does not provide an event to the player. The establishment of such an event start condition does not require cooperation of other players belonging to the team, and hence the presence/absence of the establishment of the event start condition depends on individuals.

4.23. Change of Event Depending of Number of Gathered Players

In the server device 10, the provision control unit 112 may control the type of a given event to be provided to the player or team thereof in accordance with the number of players who have established a given event start condition.

According to the configuration described above, a team can control the type of an event by adjusting the number of players who establish a start condition. When the value of an event increases as the number of players who have established a start condition, a team is given a motivation to establish a start condition by as large a number of players as possible. Consequently, a sense of togetherness among players belonging to the same team can be increased.

For example, when another player belonging to the same team as the player has established a collection condition to collect seven collection items PB, the provision control unit 112 displays an event start condition to "gather at a player character of the other player within one minute" on the terminal device 20 of the player (FIG. 11).

After that, the provision control unit 112 determines whether the player has established the event start condition. When the player has established the event start condition, the provision control unit 112 provides an event to the player. Otherwise, the provision control unit 112 does not provide an event to the player.

In addition, the provision control unit 112 counts the number of players who have established the event start condition, and provides a higher-value event to the player as the number of players becomes larger.

4.24. Change in Number of Events Depending on Collection Result

In the server device 10, the provision control unit 112 may control the number of given events to be provided to a player or a team thereof or the number of candidates thereof in accordance with a collection result of collection items PB by the player or team thereof.

According to the configuration described above, a player or a team can control the number of events or the number of candidates thereof by adjusting a collection result of collection items PB. For example, when the number of events or the number of candidates increases as the time required until the number of collected collection items PB reaches a predetermined number (seven) becomes shorter, a motivation to increase the number of collected collection items PB to reach the predetermined number as early as possible is given to a player or a team. Consequently, a sense of speed of the game increases.

Figure 12:
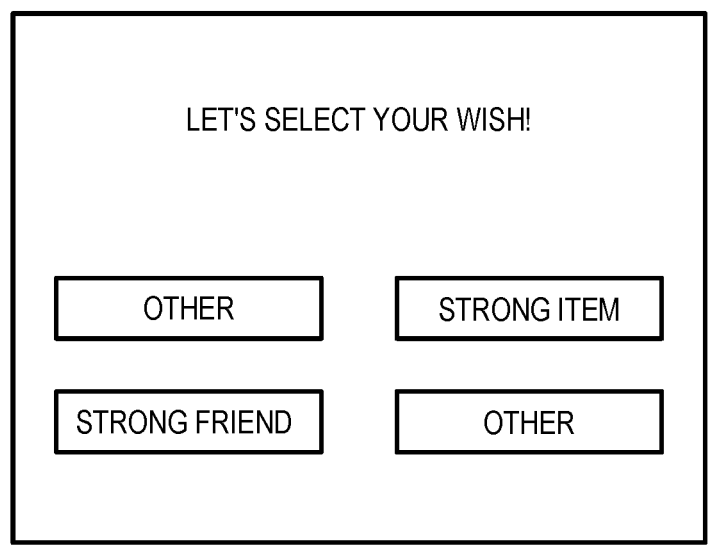
FIG. 12 is a diagram illustrating an example of a display screen when a player character of a player has arrived at the same area as a player character of another player who satisfied a condition within a time limit in one embodiment of the present invention.

FIG. 12 is a screen (wishing screen) for presenting candidates of an event to the player. In the example in FIG. 12, four randomly-selected candidates of "Provide strong item", "Strong friend joins team", and "Other" are presented. The provision control unit 112 displays the four candidates on the terminal device 20 of the player, and the player selects (taps) any one of the four candidates displayed on his/her own terminal device 20, and transmits the selected candidate to the server device 10. The provision control unit 112 provides an event related to the selected candidate to the player.

In this case, the provision control unit 112 sets the number of candidates presented to the player to four when the required time of the player is less than a first threshold, sets the number of candidates presented to the player to three when the required time of the player is equal to or more than the first threshold and less than a second threshold, sets the number of candidates presented to the player to two when the required time of the player is equal to or more than the second threshold and less than a third threshold, and sets the number of candidates presented to the player to one when the required time of the player is equal to or more than the third threshold.

4.25. Share Collection Item and Event in Team

In the server device 10, when the entire team to which a player belongs has established a given collection condition for a collection result of collection items PB, the provision control unit 112 may allow the provision of at least a part of given events to the player.

The "collection condition" includes a condition that the team owns a predetermined number of (seven) collection items PB.

According to the configuration described above, a player can be provided with at least a part of events when the entire team to which the player belongs has established a collection condition even when the player has not established the collection condition by his/herself. Thus, the player is given a motivation to assist the establishment of the collection condition by another player belonging to the same team as the player. Consequently, a sense of togetherness among players belonging to the same team can be increased.

For example, the provision control unit 112 calculates the total of the number of collection items PB owned by the team as a whole on the basis of the owned item list 146A of the player and the owned item list 146A of another player belonging to the same team as the player, and monitors the total. When the total has reached "7", the provision control unit 112 provides an event to the player even when the number of collection items PB owned by the player is less than 7.

4.26. Notification of Competition Result

The server device 10 may further cause a computer to function as a notification information generation unit configured to generate, when another player or a team thereof other than the player or team thereof has established a given collection condition for a collection result of collection items PB, notification information that notifies the player or team thereof of the fact that the given collection condition has been established as notification information supplied to the player or team thereof.

The "collection condition" includes a condition that a player or a team thereof owns a predetermined number of (seven) collection items PB.

According to the configuration described above, when another player or another team other than the player or the team has established a collection condition, notification information indicating the fact is generated. Thus, the player or team thereof can grasp the fact at appropriate timing.

4.27. Reset after Event

In the server device 10, when a given event is provided to the player or team thereof, the object arrangement unit 106 may delete a collection item PB from the collection result of the player or team thereof, and rearrange the deleted collection item PB in a game space.

According to the configuration described above, the player or team thereof can be given a feeling that an event can only be provided in return for a collected collection item PB.

4.28. Specific Example of Event

In the server device 10, a given event may include at least one of the provision of an item or information that can be used in a game and the provision of a right to play a game that is executed in or outside a game.

The "item or information" includes an item and information such as a hint related to the progress of a game.

The "play right" includes a right to join an item lottery event (present gacha).

According to the configuration described above, the player or team thereof can be given at least one of an item, information, and a play right in a given event.

4.29. Parameter Change Depending on Acquisition Situation of Collection Item

In the server device 10, the result management unit 109 further manages a parameter set to a collection item PB, and when the player or team thereof has acquired a collection item PB, adds a parameter corresponding to an acquisition situation of the collection item PB to the collection result of the player or team thereof in association with a collection object.

The "parameter" includes an attribute and a level.

The "acquisition situation" includes whether a collection item has been acquired by a competition and the difficulty of a condition imposed for the acquisition.

According to the configuration described above, a parameter of a collection item PB changes depending on an acquisition situation of the collection item PB by the player. Thus, the player or team thereof can adjust the parameter of the collection item PB by changing the acquisition situation of the collection item PB by his/herself. Consequently, a player or a team thereof can tactically acquire a collection item PB.

For example, the result management unit 109 sets the level of a collection item PB acquired by the player by a competition to be higher than the level of a collection item PB acquired by the player without a competition (for example, a collection item PB picked up by the player). For two collection items PB acquired by the player by winning a competition, the result management unit 109 sets a higher level to a collection item PB that is acquired by a competition from an opponent having a higher level.

5. Flow

Figure 13:
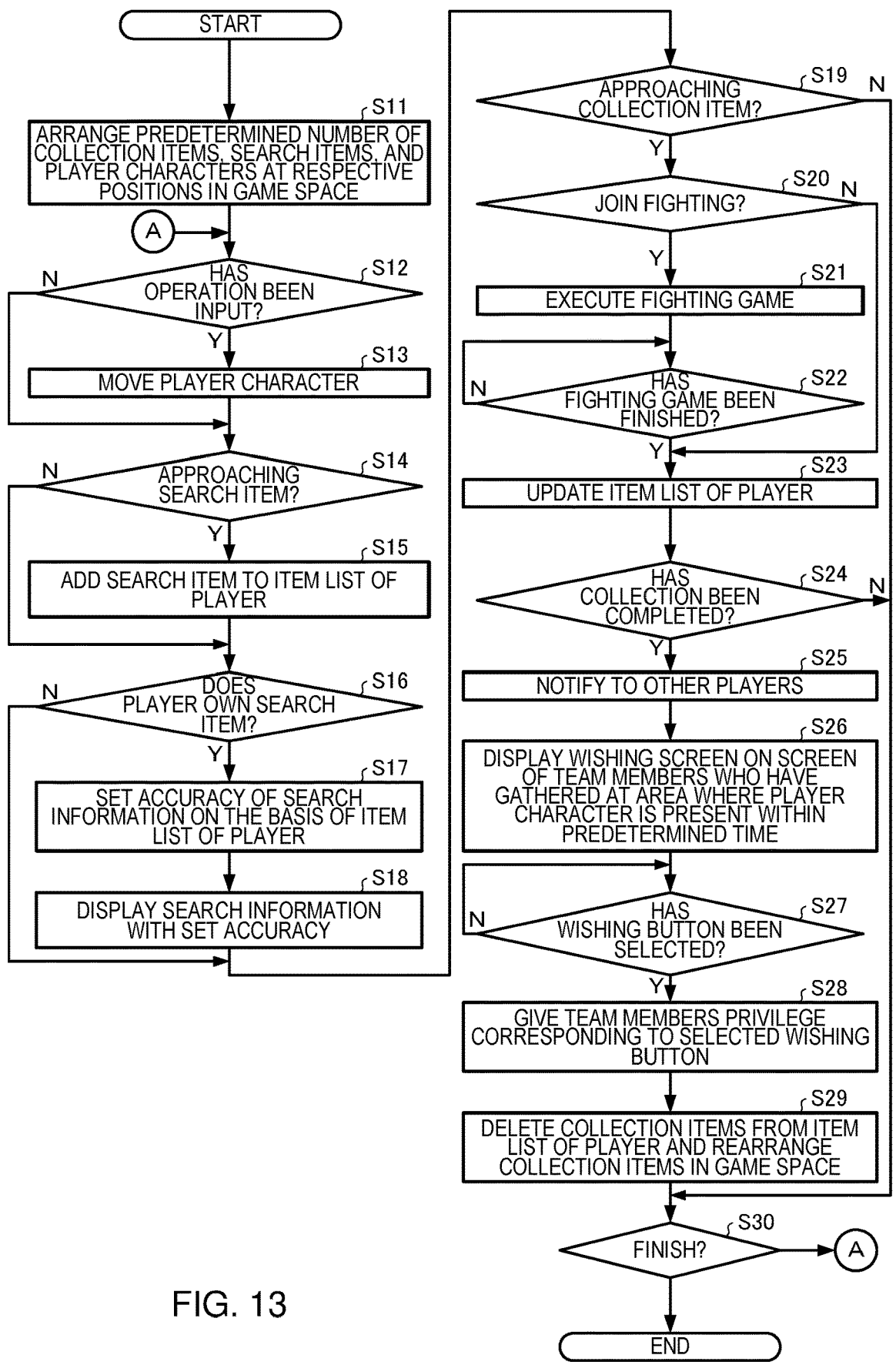
FIG. 13 is a diagram for describing an example of a flow of processing of a server device in one embodiment of the present invention.

FIG. 13 is a diagram for describing the flow of processing related to an item collection game. This processing is executed by the processing unit 100 in the server device 10. The function sharing in the processing unit 100 has already been described, and hence the following description assumes that the subject that executes processing is "processing unit 100".

It is supposed that the number of collection items present in a game space is "7", the number of players is "4", and the number of teams is "2". It is supposed that the two teams are "enemies" against each other. When a player character of a player owning a collection item is present in the same area as the area of a player character of another player at the same timing, these players are given a chance to play a fighting game to compete for betting the collection item. When any of the players has collected seven collection items, a privilege event is provided to both of other players belonging to the same team as the player and the player. Thus, each of the four players can be provided with a privilege event when the player himself/herself has collected seven collection items or when another player belonging to the same team has collected seven collection items.

First, when an item collection game is started, the processing unit 100 arranges collection items PB1 to PB7, a plurality of search items SL1, SL2, . . . , and player characters P1 to P4 of four players at respective positions in a game space (FIG. 5) (S11).

Next, the processing unit 100 determines whether operation input of any of the four players has been detected (S12). When operation input of any of the four players has been detected (S12Y), the processing unit 100 changes the position of a corresponding player character Pi in the game space (FIG. 5) in accordance with the operation input (S13). When operation input of any of the four players has not been detected (S12N), the processing unit 100 proceeds to the next determination processing (S14).

Next, the processing unit 100 determines whether any of the player characters P1 to P4 has approached a search item SL by a distance of less than a threshold (S14). When any of the player characters P1 to P4 has approached (S14Y), the processing unit 100 adds the search item SL in the owned item list 146A (FIG. 4) of the corresponding player (S15). On the other hand, when none of the player characters P1 to P4 has approached the search item SL by less than a predetermined distance (S14N), the processing unit 100 proceeds to the next determination processing (S16).

Next, the processing unit 100 determines whether any of the four players owns a search item SL on the basis of the owned item lists 146A (FIG. 4) of the four players (S16). When any of the four players owns a search item SL (S16Y), the processing unit 100 sets the accuracy of search information supplied to the corresponding player on the basis of the owned item list 146A (FIG. 4) of the player (S17), and displays the search information on the terminal device 20 of the player with the accuracy (S18).

On the other hand, when none of the four players owns a search item SL (S16N), the processing unit 100 skips the processing (S17, S18) related to the display of search information, and proceeds to the next determination processing (S19).

Next, the processing unit 100 determines whether any of the player characters P1 to P4 has approached a collection item PB by less than a predetermined distance (S19). When any of the player characters P1 to P4 has approached (S19Y), the processing unit 100 proceeds to the next determination processing (S20). When none of the player characters P1 to P4 has approached (S19N), the processing unit 100 proceeds to finish determination processing (S30).

Next, when the number of player characters Pi that have approached the collection item is two or more, the processing unit 100 gives two or more players operating the player characters a chance to join a fighting game, and determines whether join requests have been received from the terminal devices 20 of the two or more players (S20). When join requests have been received from the terminal devices 20 of the two or more players within a time limit (S20Y), the processing unit 100 proceeds to fighting game processing (S21). When join requests have not received from two or more players within a time limit or when the number of player characters Pi that have approached the collection item is "1" (S20N), the processing unit 100 skips fighting game processing (S21, S22) and proceeds to item list update processing (S23).

Next, the processing unit 100 provides a fighting game to the terminal devices 20 of two or more players that have transmitted join requests (S21). Details of the fighting game are publicly known, and hence the description thereof is omitted herein.

Next, the processing unit 100 determines whether the fighting game is finished (S22). When the fighting game is finished (S22Y), the processing unit 100 proceeds to the processing for updating the owned item list 146A (FIG. 4) (S23). When the fighting game is not finished (S22N), the processing unit 100 waits for the finish.

Next, the processing unit 100 updates the owned item list 146A of the player character Pi that has approached the collection item (S23). Specifically, when a fighting game is executed (S20Y), the processing unit 100 transfers an ownership of the collection item to a player who won the fighting game. In other words, when a player who owns a collection item lost a fighting game, the processing unit 100 transfers an ownership of the collection item that was owned by the player to a player who won the fighting game. When a fighting game is not executed (S20N), the processing unit 100 transfers the ownership of the collection item from a game administrator to the player operating the player character Pi.

Next, the processing unit 100 determines whether there is a player whose number of owned collection items has reached "7" (achieved player) (S24). When there is an achieved player (S24Y), the processing unit 100 notifies other players of the fact (S25). When there is no achieved player (S24N), the processing unit 100 proceeds to the finish determination processing (S30).

Next, when a player (friendly player) belonging to the same team as the achieved player has gathered at an area where the achieved player is present within a time limit in the game space (FIG. 5), the processing unit 100 displays a wishing screen (FIG. 12) on the terminal devices 20 of both of the friendly player and the achieved player (S26). In the wishing screen (FIG. 12), a plurality of candidates (wishing buttons) are arranged.

Next, the processing unit 100 determines whether any of the plurality of wishing buttons has been selected (S27). When any of the plurality of wishing buttons has been selected (S27Y), the processing unit 100 provides an event corresponding to the selected wishing button to both of the achieved player and the friendly player (S28). When no wishing button has been selected (S27N), the processing unit 100 waits for the selection.

Next, the processing unit 100 deletes seven collection items PB1 to PB7 from the item list of the achieved player, and rearranges the seven collection items PB1 to PB7 at respective positions in the game space (S29).

Next, the processing unit 100 determines whether an instruction to finish the item collection game has been received from the terminal device 20 of any of the players (S30). When the instruction has been received (S30Y), the processing unit 100 finishes the flow. Otherwise (S30N), the processing unit 100 returns to the operation input determination processing (S12).

A part of the order in the flow in FIG. 13 can be replaced. Steps in a part of the flow in FIG. 13 can be omitted.

6. Functions and Effects

As described above, according to the above-mentioned embodiment, the accuracy of search information that can be acquired by a player changes in accordance with a collection result of collection items by the player, and hence the difficulty level of searching can be increased or suppressed as the collection of collection items progresses. By appropriately controlling the difficulty level of searching in this manner, the attractiveness of searching of collection items itself can be effectively improved.

7. Supplemental

The object giving unit 108 in the above-mentioned embodiment may, when the player has established a given positional condition between a collection item PB and the player character P1 in the game space (FIG. 5), give the player a chance to acquire the collection item PB or directly give the player the collection item PB (see the case where a fighting game has not been executed in the description of Step S23).

8. Others

The present invention is not limited to the description in the above-mentioned embodiment, and various kinds of modifications can be made. For example, the terms cited in descriptions in the specification or the drawings as terms in a broad sense or synonymous terms can be replaced with terms in a broad sense or synonymous terms also in other descriptions in the specification or the drawings.

In the game system in the above-mentioned embodiment, each game may be provided to the terminal device 20 by a single server device 10, or each game may be provided to the terminal device 20 in a manner that a plurality of server devices 10 cooperate to form a server system. In other words, a part or whole of the functions of the server device 10 may be implemented on the terminal device 20 side (that can be regarded as "game device"). The function sharing of the processing unit 100 in the server device 10 is not limited to the one described above.

The present invention includes substantially the same configuration as the one described in the embodiment (for example, a configuration whose function, method, and result are the same or a configuration whose object and effect is the same). The present invention includes a configuration obtained by replacing a non-essential part of the configuration described in the embodiment. The present invention includes a configuration that exhibits the same functions and effects as those of the configuration described in the embodiment or a configuration that can achieve the same object as that of the configuration described in the embodiment. The present invention includes a configuration obtained by adding publicly known technology to the configuration described in the embodiment.

While the embodiment of the present invention has been described above in detail, it should be understood by a person skilled in that art that many modifications can be made without substantially departing from novel matters and effects of the present invention. Thus, such modified examples are all included in the scope of the present invention.

What is claimed is:

1. A non-transitory computer-readable information storage medium having stored thereon a program of a game in which: (a) a player searches for two or more collection items arranged at different positions in a game space, and (b) a given event is provided to the player in accordance with a collection result of the collection items, the program causing a computer to perform steps comprising:

arranging a plurality of the collection items and an operation target of the player in the game space;

controlling movement of the operation target in the game space in accordance with an operation input of the player;

giving, when the player has established a given positional condition between each of the collection items and the operation target in the game space, the player the collection item or a chance to acquire the collection item;

managing a collection result of the collection items by the player in association with the operation target of the player, the collection result comprises a quantity of collection items owned by the player;

setting a search area that moves in the game space in accordance with the movement of the operation target;

generating information on presence/absence or a position of each of the collection items in the search area, as search information supplied to the player;

changing an accuracy of the search information supplied to the player in accordance with the quantity of the collection items owned by the player in an owned item list assigned to the player; and controlling the provision of the given event to the player in accordance with the collection result of the collection items by the player.

2. The information storage medium according to claim 1, further comprising:
further arranging, in the game space, a search item necessary for the player to receive the supply of the search information,
giving the player the search item or a chance to acquire the search item when the player has established a given positional condition between the search item and the operation target,
further managing a collection result of the search item by the player in association with the operation target of the player, and
controlling the search information supplied to the player in accordance with the collection result of the search item by the player.

3. The information storage medium according to claim 2, wherein the game is a competition game in which the player or a team thereof competes for collection results of the collection items against an opponent.

4. The information storage medium according to claim 3, further comprising:
when the player or team thereof has established a given competition start condition, providing the player or team thereof a chance to play a game for competing against the opponent for betting each of the collection items, as a chance to acquire the collection item.

5. The information storage medium according to claim 3, further comprising:
when the player or team thereof owns the search item, controlling the search information supplied to the player or team thereof in accordance with at least one of a distance from an operation target of the player or team thereof to an operation target of another player or a team thereof owing the search item, and the number of other players or teams thereof.

6. The information storage medium according to claim 3, further comprising:
when the player owns the search item and the player has created a team with another player owning the search item, changing the search information supplied to the player.

7. The information storage medium according to claim 3, further comprising:
when the player owns the search item, controlling the search information supplied to the player in accordance with the number of search items owned by an entire team to which the player belongs.

8. The information storage medium according to claim 3, further comprising:
when the player or team thereof owns the search item, controlling the search information supplied to the player or team thereof in accordance with an attribute of the player or team thereof, an attribute of another player or a team thereof owning the search item, and the number of other players or teams thereof.

9. The information storage medium according to claim 3, further comprising:
managing, when the player or team thereof owns the search item, communication performed between the player or team thereof and another player or a team thereof owning the search item.

10. The information storage medium according to claim 3, further comprising:
further managing a parameter set to the player or team thereof, and
when the player or team thereof owns the search item, controlling the search information supplied to the player or team thereof in accordance with the parameter of the player or team thereof.

11. The information storage medium according to claim 3, further comprising:
limiting team creation or team joining by the player when the player has not established a given collection condition for the collection result of each of the collection items.

12. The information storage medium according to claim 3, wherein the search information includes at least one of information on presence/absence of each of the collection items in the search area, information on a position of the collection item in the search area, and information on suggestion of the position of the collection item in the search area.

13. The information storage medium according to claim 3, wherein
the search information indicates an image of the search area, and
the program causes the computer to perform a step of controlling at least one of: (i) a spatial resolution of the image serving as the search information, (ii) a temporal resolution of the image, (iii) a size of the search area, and (iv) a shape of the search area.

14. The information storage medium according to claim 3, further comprising:
when the player or team thereof owns the search item, controlling the search information supplied to the player or team thereof in accordance with an environment of the operation target of the player or team thereof in the game space.

15. The information storage medium according to claim 3, further comprising:
when the player or team thereof owns the search item, changing the search information supplied to the player or team thereof in return for assessing a cost to the player or team thereof.

16. The information storage medium according to claim 1, wherein
the collection result comprises the number of collection items owned by the player; and
the program causes the computer to perform a step of controlling the search information supplied to the player in accordance with the number of collection items owned by the player.

17. The information storage medium according to claim 1, wherein
the collection result comprises collection speed of collection items owned by the player; and
the program causes the computer to perform a step of controlling the search information supplied to the player in accordance with the collection speed.

18. The information storage medium according to claim 1, wherein
the collection result comprises attributes of collection items owned by the player; and
the program causes the computer to perform a step of controlling the search information supplied to the player in accordance with the attributes of collection items.

19. A server device that executes a game in which: (a) a player searches for two or more collection items arranged at different positions in a game space, and (b) a given event is provided to the player in accordance with a collection result of the collection items, the server device comprising:
   at least one processor and/or circuit configured to:
     arrange a plurality of the collection items and an operation target of the player in the game space;
     control movement of the operation target in the game space in accordance with an operation input of the player;
     give, when the player has established a given positional condition between each of the collection items and the operation target in the game space, the player the collection item or a chance to acquire the collection item;
     manage a collection result of the collection items by the player in association with the operation target of the player, the collection result comprises a quantity of collection items owned by the player;
     set a search area that moves in the game space in accordance with the movement of the operation target;
     generate information on presence/absence or a position of each of the collection items in the search area, as search information supplied to the player;
     change an accuracy of the search information supplied to the player in accordance with the quantity of the collection items owned by the player in an owned item list assigned to the player; and
     control the provision of the given event to the player in accordance with the collection result of the collection items by the player.

20. A non-transitory computer-readable information storage medium having stored thereon a program of a game in which a player searches for two or more collection items arranged at different positions in a game space and a given event is provided to the player in accordance with a collection result of the collection items, the program causing a computer to perform steps comprising:
   arranging a plurality of the collection items and an operation target of the player in the game space;
   controlling movement of the operation target in the game space in accordance with operation input of the player;
   giving, when the player has established a given positional condition between each of the collection items and the operation target in the game space, the player the collection item or a chance to acquire the collection item;
   managing a collection result of the collection items by the player in association with the operation target of the player;
   setting a search area that moves in the game space in accordance with the movement of the operation target;
   generating information on presence/absence or a position of each of the collection items in the search area, as search information supplied to the player;
   controlling the search information supplied to the player in accordance with the collection result of the collection items by the player;
   when the player or team thereof owns the search item, controlling the search information supplied to the player or team thereof in accordance with an attribute of the player or team thereof, an attribute of another player or a team thereof owning the search item, and the number of other players or teams thereof; and
   controlling the provision of the given event to the player in accordance with the collection result of the collection items by the player.

\* \* \* \* \*